United States Patent
Rogers et al.

(10) Patent No.: US 7,501,006 B2
(45) Date of Patent: *Mar. 10, 2009

(54) MALT EXTRACT OR SPENT GRAIN LIQUOR BASED FERTILIZER

(75) Inventors: Peter John Rogers, Williamstown (AU); Robert White Gilbert, Laverton (AU); Michael Andrew Pecar, Southbank (AU)

(73) Assignee: Carlton and United Breweries Limited, Victoria (AU)

( * ) Notice: Subject to any disclaimer, the term of this patent is extended or adjusted under 35 U.S.C. 154(b) by 696 days.

This patent is subject to a terminal disclaimer.

(21) Appl. No.: 11/120,598

(22) Filed: May 3, 2005

(65) Prior Publication Data

US 2005/0204791 A1 Sep. 22, 2005

Related U.S. Application Data

(62) Division of application No. 10/031,536, filed as application No. PCT/AU00/00878 on Jul. 21, 2000, now Pat. No. 7,074,251.

(30) Foreign Application Priority Data

Jul. 21, 1999 (AU) .................................. PQ1753

(51) Int. Cl.
 *C05F 11/00* (2006.01)
(52) U.S. Cl. .................................... 71/25; 71/26; 71/6
(58) Field of Classification Search .................... 71/25, 71/26, 6
 See application file for complete search history.

(56) References Cited

U.S. PATENT DOCUMENTS

| | | | | |
|---|---|---|---|---|
| 2,446,913 A | * | 8/1948 | Erlich | 426/271 |
| 2,879,151 A | * | 3/1959 | Melville | 71/8 |
| 4,119,429 A | * | 10/1978 | Lovness | 71/6 |
| 4,197,321 A | * | 4/1980 | Chyba et al. | 426/11 |

* cited by examiner

*Primary Examiner*—C. Sayala
(74) *Attorney, Agent, or Firm*—Fulbright & Jaworski LLP

(57) ABSTRACT

This invention relates to soil conditioner, fertilizer and fungicide compositions. In particular it relates to soil conditioner, fertilizer and fungicide compositions that utilizes by-products from brewing processes, and especially made from malt extract or spent grain liquor. The invention also relates to methods of manufacturing soil conditioners, fertilizer and fungicides.

16 Claims, 22 Drawing Sheets

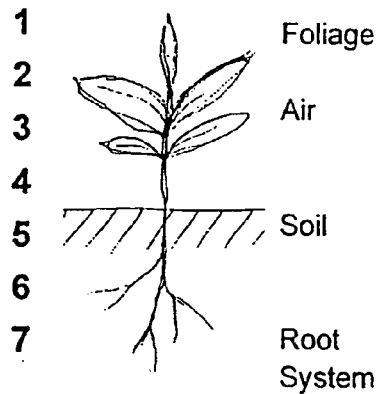

1 — Foliage
2 — Air
3
4
5 — Soil
6
7 — Root System

1. Peptides growth factors are absorbed by foliage and are accessible to cut tissue opening.
2. Microflora, complexity on foliage is increased to provide an antagonistic bio film to limit fungal spread.
3. Peptides, carbohydrates, growth factors are adsorbed to sub soil particles and increase the soil cation exchange capacity.
4. Carbonates and peptides provide nutrients for multi placations/ vitality of the microflora
5. Microflora develops soil suppressive character by natural means.
6. Immuno-stimulants including glucans attach to the root system and trigger immuno responsive cascade in the plants
7. Peptides and polysaccharides provide constant slow release of amino acids and sugars for plant root and microbial nutrition.

FIGURE 1

23rd March 1999, 11 Days
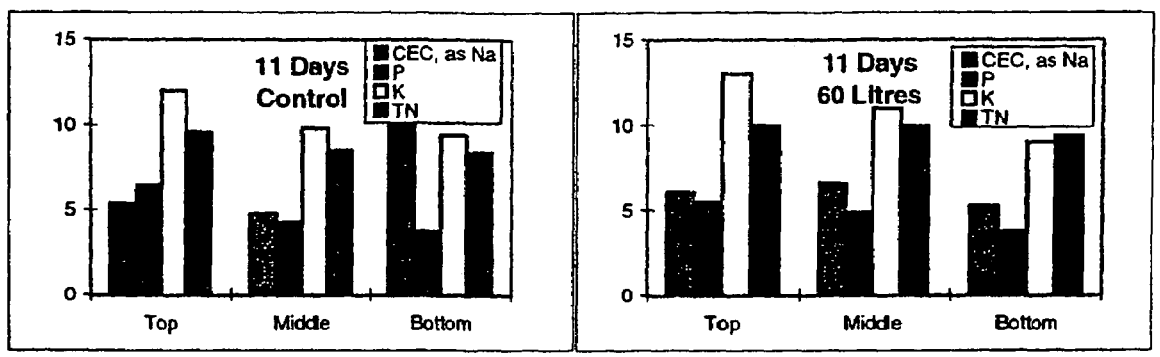
1st April 1999, 21 Days
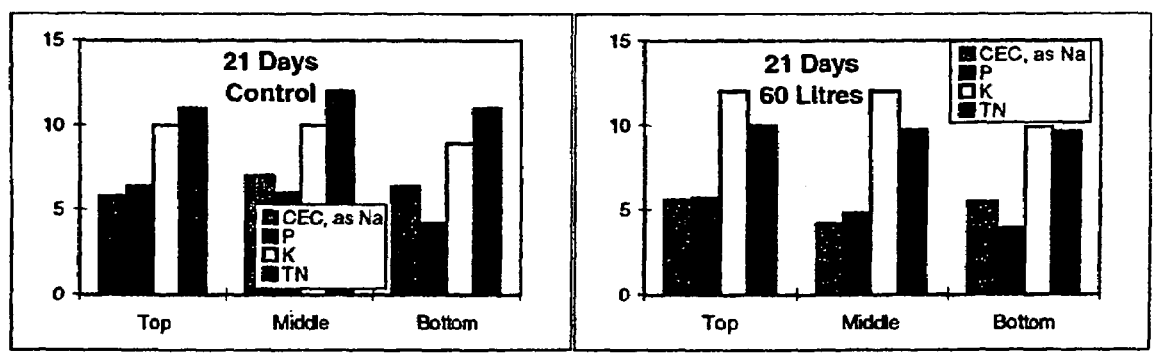
8th April 1999, 28 Days
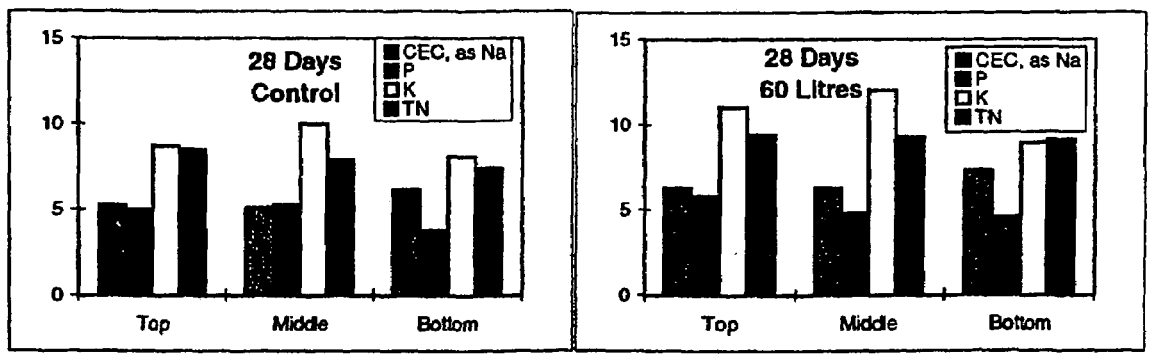
FIGURE 6

15th April 1999, 35 Days
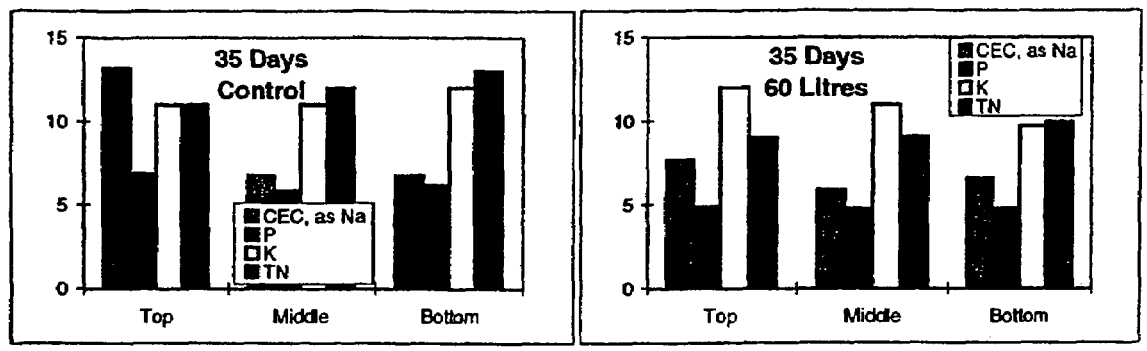
22nd April 1999, 42 Days
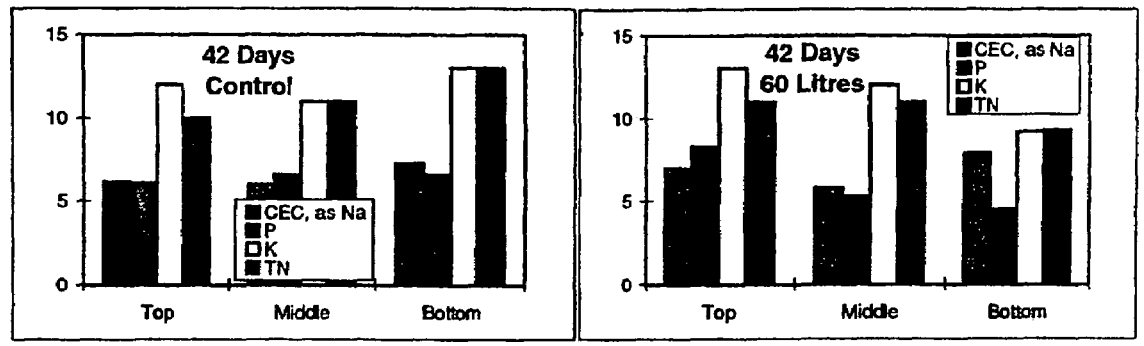
FIGURE 6 CONTINUED:

23rd March 1999, 11 Days
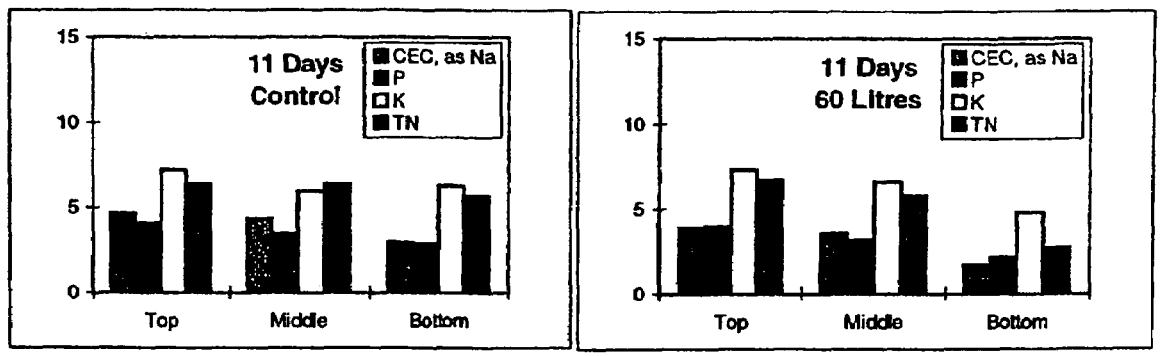
1st April 1999, 21 Days
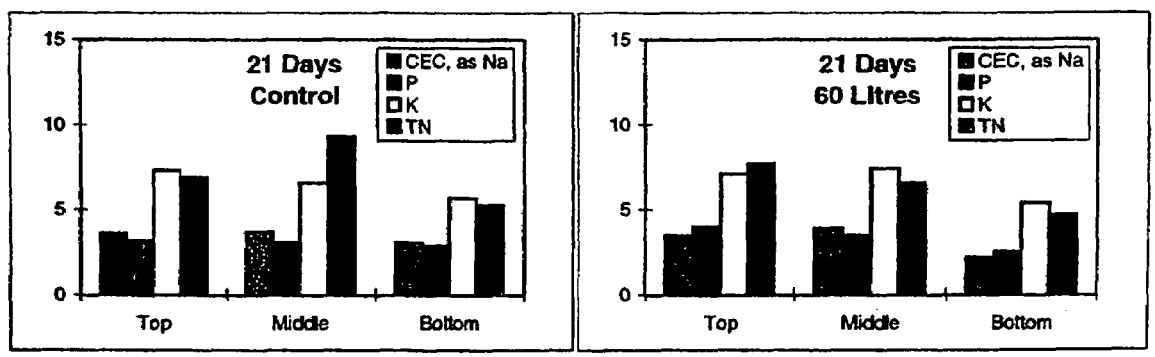
8th April 1999, 28 Days
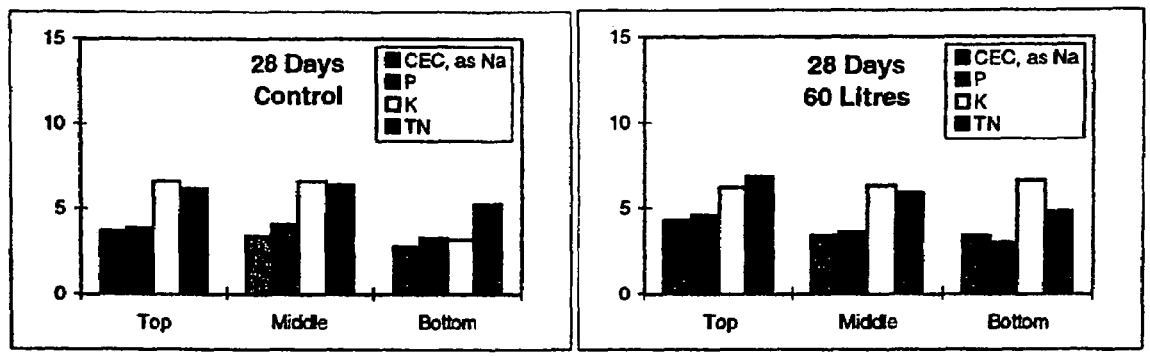
FIGURE 7

15th April 1999, 35 Days
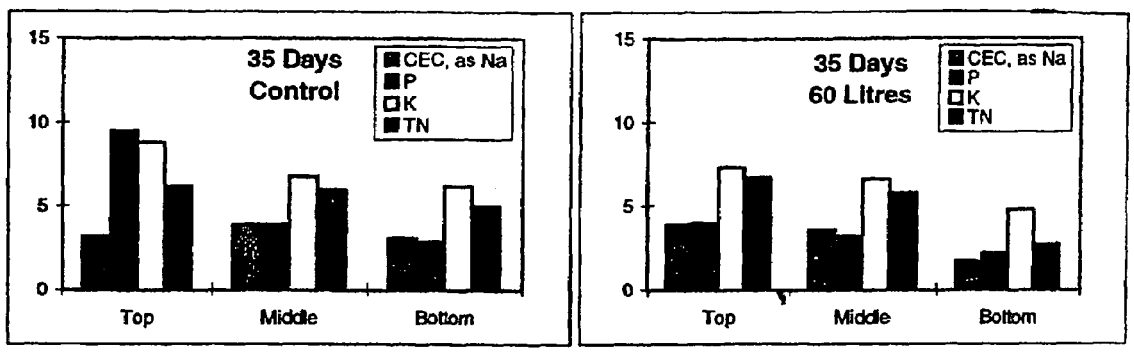
22nd April 1999, 42 Days
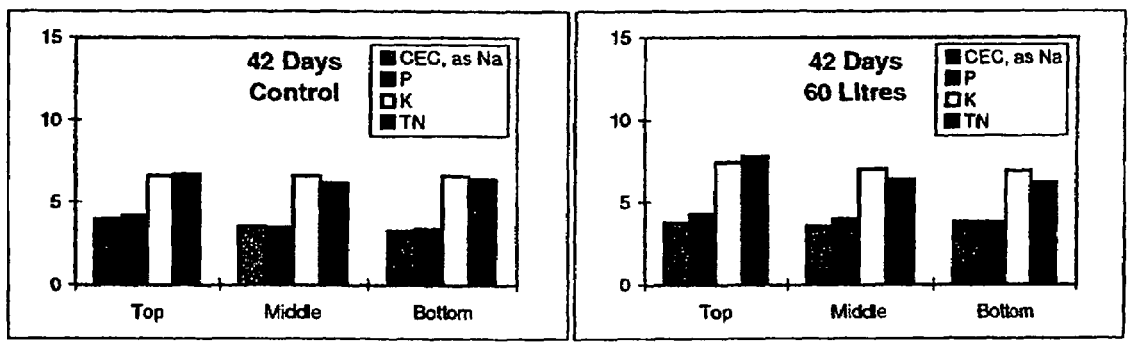
FIGURE 7 CONTINUED:

* textured bars = statistically different to control

*texture bars = statistically different to control

MALT EXTRACT OR SPENT GRAIN LIQUOR BASED FERTILIZER

This application is a divisional application of U.S. Ser. No. 10/031,536 filed Apr. 10, 2002, now U.S. Pat. No. 7,074,251, which is a §371 of PCT/AU00/00878 filed Jul. 21, 2000, which claims priority from Australian Patent application Ser. No. PQ 1753 filed Jul. 21, 1999, herewith incorporated by reference.

FIELD OF THE INVENTION

The present invention relates to soil conditioner, fertilizer and fungicide compositions. In particular it relates to soil conditioner, fertilizer and fungicide compositions that utilizes by-products from brewing processes. It especially relates to soil conditioner, fertilizer and fungicide compositions that are made from malt extract or spent grain liquor, as herein defined.

BACKGROUND OF THE INVENTION

One of the most critical problems associated with intensive agricultural activities has been the degradation of the natural environment due to the overuse of chemical fertilizers. Research has shown that the potential problems associated with the overuse of chemical fertilizers may outweigh the benefits of increases in crop production. However, despite this, it has been predicted that "the use of chemical fertilizers must be expanded two- to threefold to maintain soil fertility and productivity in the developing countries over the next 25 years if the world is to feed itself." Dr Norman Borlaug Nobel Peace Prize recipient.

There are a number of reasons why increased use of chemical fertilizers has been predicted, including increased human population and the replacement of traditional foods with cereals like wheat. However, a more worrying reason is that yields from traditional agricultural lands are falling. Although the reason for this is not known, even more chemical fertilizer has usually been used in an attempt to reverse the trend. However, one factor that has been noted is that the amount of topsoil in these areas has steadily been declining, and that normal microbial activity is reduced.

One area of agriculture that traditionally utilizes large quantities of chemical fertilizers is monoculture crop production. Monoculture crops include sugarcane, cereals such as wheat and barley, and turf. Turf production especially uses large amounts of chemical fertilizers. Turf production, as typified in golf courses, race courses, public areas and parkland management, involves the maintenance of the appropriate nutrient levels in the soil, management of the sub-soil structure, protection against invasive fungal diseases, and development of a turf bed that is appropriate for the application (Crockford, 1992). The protocols used often place heavy emphasis on the use of inorganic nutrients, the use of fungicides, and intense mechanical interventionist procedures to produce satisfactory long-term results.

Another problem associated with turf production is the continual loss of N, P, K and other nutrients from grass clippings. The extensive use of sandy substrata limits the retention of added inorganic nutrients, as sand provides few binding sites for the adhesion of inorganics. The addition of fungicides and chemicals to control fungal infestations is common practice, and the lack of organic complexity-leads to low cation exchange capacity (CEC), making it more likely that these inorganic nutrients can leak into the water table. In addition, the permeability of the subsoil means that water utilisation is inefficient and energy usage through irrigation systems is relatively high.

The production of turf and other monoculture crops has, like many others, seen a decline in yield in recent years (Magarey, 1994). Usually this decline has been regarded as a result of disease rather than attributed to the use of chemical fertilizers, and has been dealt with in four ways:
1) Chemically, by the use of fumigation and fungicides;
2) By the use of disease-resistant plants;
3) By rotation or fallowing; and
4) Biological control (Weller, 1988).

While these approaches have not solved the problems of decline in yield, they have produced some interesting observations. Many studies have suggested that root health and, to a lesser extent, soil organic matter levels, are the main contributing factors to the growth of various plants (Papavizas and Lumsden, 1980). Moreover, it has been seen that declining monoculture yield seems to occur when continuous cropping with a susceptible crop results in disease.

However, it has also been observed that in some instances the disease-causing pathogen may create a favourable environment for multiplication of other microorganisms that are its natural enemies. This can occur because an adequate food base for the progressive development of microorganisms antagonistic to the pathogen is produced.

In some soil, disease does not occur in susceptible host plants even though the pathogen is present, or is introduced into the soil. Such soils are referred to as suppressive and have been reported for several fungal pathogens such as *Phytophthora* spp, *Fusarium* spp, *Gaeumanomyces* spp, and *Rhizoctonia* spp for example. In soils that are generally suppressive, the suppressive character is probably due to the entire microflora acting as a brake on the growth and propagation of the pathogen(s). Specific suppressiveness occurs when one or two organisms control the pathogen through specific mechanisms (Cook, 1993).

In the case of turf, it has been shown that the severing of the leaf tips during mowing may provide an entry point for fungi such as *Rhizoctonia* and *Fusarium* spp which then colonise and debilitate the plants (Spurr and Knudsen, 1985; Schisler and Slininger, 1994; Kahl, 1978). However, suppressive compost mixtures have been developed which can combat some of these effects.

It has been suggested that suppressiveness may also be due to the architecture of plant resistance mechanisms due to the accumulation of some particular chemical elicitor(s). This has been suggested as an important means of disease control in plants (Cartwright et al., 1977; Schönbeck and Dehre, 1986). Barley can activate a number of resistance mechanisms in response to attempted penetration by powdery mildew. These include the development of papillae with fluorescent haloes (Thordal-Christensen et al., 1988), accumulation of inorganic compounds (Kunoh and Ishizaki, 1976), increased peroxidase activity (Kerby and Somerville, 1989), formation of phenolics (Shiraishi et al., 1989) and the synthesis of proteins that appear to be a response to the pathogen (Apel et al., 1990; Bryngelsson and Green, 1989).

Glucans have also been shown to elicit an immune response in animals, crustaceans and plants. This may be due to the fact that glucans are present in the cell wall of many fungi, and attachment of exogenous glucan to plant receptor sites may mimic the attachment of pathogenic fungi. Growth factors may also stimulate plant protection mechanisms; see for example our earlier application WO97/02356 the entire disclosure of which is incorporated herein via reference. During vigorous growth, cell multiplication and extension of tissue provides greater access to invasive pathogens. This enhances the systems designed to cope with stress.

All of these observation have led researchers to conclude that enhancing the well-being of the rhizosphere may be as important as providing nutritional support for the plants through fertilization. In other words, crop yields may be reduced in those areas that utilize the most chemical fertilizers, because chemical fertilizers do not provide adequate resources for the natural microflora and fauna to proliferate. Without such microorganisms there is a greater incidence of root disease and pathogenic infection.

Accordingly, there, is a need for an alternative to chemical fertilizers which increases crop production, while minimizing the degradation of the environment. In particular, there is a need to have an alternative that reduces the incidence of disease in plants, improves root health and improves the levels of organic matter in the soil.

One alternative that has been actively pursued in recent times is organic fertilizers. Generally, organic fertilizers are more environmentally friendly, while still providing very good nutritional support for plants. Furthermore, it has been shown that organic fertilizers have an added benefit in that they are capable of promoting the growth of soil microbes. These microbes often produce antibiotics that are capable of deterring the growth of non-beneficial soil fungi, thereby preventing diseases of vegetables and lawn grass.

Some microorganisms, like *Trichoderma* and *Mycorrhiza*, aid a plant's uptake of water and nutrients and stimulate its growth, while others assist in:
1. Decomposition of crop residues, manure and other organic material;
2. Retention of nutrients;
3. Nutrient recycling;
4. Biological control of root rot and parasitic nematodes;
5. Production of plant growth regulators; and
6. Soil structure and tilth.

A further benefit of using organic fertilizers is that they are generally made from industrial wastes or animal effluent. These wastes have, for many years, been a source of environmental pollution in their own right; however, as increased negative data have been obtained about the use of chemical fertilizers, the use of organic wastes to make organic fertilizers has increased. Unfortunately, not all organic wastes are useful as organic fertilizers, and the processes involved in turning these into fertilizers can be costly. Accordingly, while the use of organic fertilizers is increasing, and the need for such organic fertilizers is evident, an appropriate source of "cheap" raw material has not been found to date.

One source of cheap raw material is waste by-products from the brewing and fermentation processes. Some attempts at utilizing these wastes have been undertaken in the past. For example, one by-product that has been used in the past is the spent grain left over from the beer brewing process. Spent grain is a mixture recovered after separation of the wort extract by filtration through a mash filter, a Lauter Tun or similar device.

Another by-product from the beer brewing industry that has been used is the liquid waste after fermentation has been undertaken. This waste usually requires treatment steps with high energy or chemical input, and often the waste at this stage has had many of the nutrients removed. For example, Japanese Patent No. JP75002901 by Takara Shugo Co. Ltd. describes the use of waste liquid from brewing. The waste liquid was described as containing yeasts, non-fermentable sugars, proteins, organic acids, and potassium. However, the waste liquid used was obtained via a condensation process after fermentation of molasses, and the recovered material was calcined at 850° C. This process is not only energy-intensive, but all of the protein, enzymes, plant hormones and naturally present microorganisms are destroyed by the fermentation and calcination processes, resulting in a fertilizer which is potentially no better than a "normal" chemical fertilizer. Indeed, such a preparation would have low levels of sugars, dextrins, proteins, and vitamins.

Accordingly, the present invention attempts to overcome or at least alleviate some of the problems associated with providing a cheap, organic fertilizer which not only provides adequate nutritional support for plants, but also encourages the proliferation of soil microorganisms, thereby improving soil condition.

The applicant has now surprisingly found that malt extract, termed "brewer's extract" and/or spent grain liquor, are capable of stimulating plant growth and appearance, while dramatically improving soil structure and function. Moreover, it has also been found that spent grain liquor acts antagonistically against some examples of known pathogenic fungi. While some of these results may be attributable to the nutrient levels in these preparations, the results in the main are not solely ascribed to these nutrients as the visual appearance of plants are dramatically improved compared to the appearance of plants treated with traditional inorganic fertilisers plus biocide regimes.

SUMMARY OF THE INVENTION

The present invention provides a fertilizer composition comprising malt extract or spent grain liquor as herein defined.

Preferably, the malt extract or spent grain liquor comprises cations, free amino nitrogen, glucans, carbohydrates, sugars, amino acid peptides, and polyphenols. More preferably, the malt extract or spent grain liquor is a by-product of brewing processes. Most preferably, the malt extract or spent grain liquor is a by-product of a beer brewing process.

The fertilizer composition may comprise liquid plus particulates. The liquid may contain simple sugars, free amino nitrogen predominantly in the form of protein, glucans, vitamins and calcines. Preferably, these constituents are extracted from the malt extract or spent grain during the brewing process.

The particulates may include protein, lipids and carbohydrates.

The fertilizer composition may either be a liquid, liquid suspension or a solid.

Preferably, the fertilizer composition further comprises one or more bacteria and/or yeast. More preferably, the bacteria are a mixture of organisms selected from the group consisting of *Bacillus* spp, *Pseudomonas* spp, *Azotobacter* spp, *Nitrobacter* spps, *Azospirillium* spp, and *Derxia* spp. Most preferably, the composition further comprises yeast extract and/or a yeast cell wall preparation.

The bacteria may be added in liquid suspension, as immobilized pellets, or as a dried powdered mixture.

The skilled addressee will appreciate that the application of the fertilizer composition to the plants will preferably provide soluble foliar and root nutrients and stimulators or plant protection mechanisms. The particulates will provide a slow release source of nutrients. The bacteria are designed to enhance the soil condition and promote the degradation of dead plant material, including thatch, and to reduce the opportunity for plant damage through fungal attack.

The present invention further provides a method of improving plant growth, comprising the step of applying to said plant an effective amount of a fertilizer composition comprising malt extract or spent grain liquor.

The composition may be applied to plants by any procedure known in the art. However, if the composition is a liquid or liquid suspension, it is preferably sprayed on to the plants, while if it is a powder it is mechanically spread.

Those of skill in the art will appreciate that the application of the fertilizer composition to the soil may promote the growth and viability of the bacterial population present in the composition and the existing soil microflora.

Such persons will further appreciate that the fertilizer composition may provide protection of seeds, promote healthy development and result in higher rates of seed germination in primary industry applications compared to untreated soil. In one preferred embodiment of the invention, seeds may be coated with the fertilizer composition of the present invention before planting or before packaging for sale.

The present invention further provides a method of improving soil condition, comprising the step of applying to said soil an effective amount of a fertilizer composition comprising malt extract or spent grain liquor.

The malt extract or spent grain liquor may be fortified with yeast extract and/or yeast cell wall material which supplements the vitamin, sugar, cation, protein and polypeptide, carbohydrate and glucan content of the mixture. The mixture could also be fortified with organic and inorganic substances from a variety of sources in order to achieve specified levels of inorganics and organics.

The present invention further provides a method of preventing or inhibiting fungal growth, comprising the step of applying to soil or plants an effective amount of a composition comprising malt extract or spent grain liquor.

While not wishing to be bound by any specific theory, the applicant believes that the fertilizer composition of the present invention provides good soil structure and function which improves cation exchange capacity (CEC), and may allow for better uptake of nutrients by the plant.

The proposed effects on foliage and soil are summarised in FIG. 1.

The peptides and growth factors in the fertilizer composition seem to absorbed by the foliage and any wounded tissue areas. The microflora on the foliage is increased to provide an antagonist biofilm that combats the spread and pathogenicity of fungi. The biofilm also assists the breakdown of decaying foliage immediately below the green, photo-active foliage, which is commonly referred to as the thatch layer. The carbohydrates and proteins may provide substrates for the microflora, as well as the root system. The particles and the complex biopolymers may also provide charged nucleation sites that enhance CEC. The insoluble protein/carbohydrate particles may provide a constant source of amino acids, peptides and sugars that are slowly released by chemical and enzymatic activity. All of these together enhance the soil suppressive character of soils towards turf pathogens, while at the same time providing essential nutrients.

When the fertilizer composition is further supplemented with bacteria, the degradation of existing organic matter in the soil and the grass, particularly thatch at the air/soil interface, is encouraged. Bacterial species such as *Bacillus, Pediococcus, Lactobacilli* and *Pseudomonas* are active against some forms of fungi, and can therefore promote healthy growth by limiting fungal attack. Bacteria, including the *Lactobacilli* and *Pediococci*, are known to inhibit the growth of slime moulds such as *Fusarium* during the malting process.

*Derxia* spp are bacteria that secrete large amounts of polysaccharide material which provide active sites for the entrapment of nutrients and other bacteria. Nitrobacter and *Azospirillum* spp may also be added, as they promote nitrogen fixation for the improvement of the nutrient status of the subsoil.

In a particularly preferred embodiment a mixture of Derxia gummosa, *Azotobacter beijerinckii, Pseudomonas fluorescens, Bacillus thuringiensis* and *Bacillus subtilis* is used.

These bacteria grow and divide rapidly in medium prepared from spent grain liquor. The bacteria may be grown in liquid culture under micro-aerobic conditions. All the genera referred to above aggregate during the growth cycle, but at the time of harvest still exhibit >75% cell viability.

Throughout the description and claims of this specification, the word "comprise" and variations of the word, such as "comprising" and "comprises", means "including but not limited to" and is not intended to exclude other additives, components, integers or steps.

BRIEF DESCRIPTION OF THE FIGURES

FIG. 1 illustrates the way in which the fertilizer composition of the invention provides nutrients, immunostimulants, and provides greater intra-microbial competitiveness to support healthier plant growth.

FIG. 6 shows the effect of the fertilizer composition of the invention on the soil chemistry of "sandy soil" at a turf farm.

FIG. 7 shows the effect of the fertilizer composition of the invention on the soil chemistry of "loamy soil" at a turf farm.

DETAILED DESCRIPTION OF THE INVENTION

It will be appreciated by those skilled in the art that the soil conditioner, fertilizer and fungicide compositions of the present invention can be obtained from a number of by-products of the brewing process. The by-product streams consist of soluble and insoluble fractions. The soluble fraction of the by-products consists of a mixture of complex carbohydrates, simple sugars and free amino nitrogen. Particulates consist primarily of protein and carbohydrate.

Figure 2:
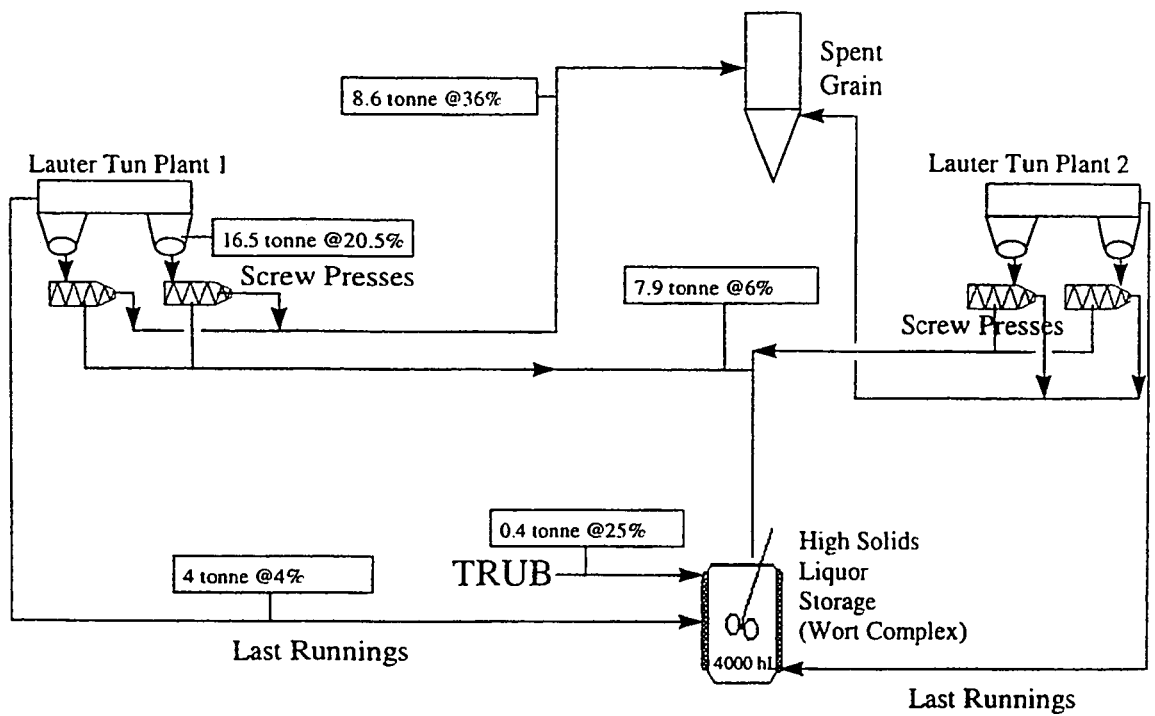
FIG. 2 shows the typical flow of beer brewing by-product streams from the brewhouse.
Figure 3:
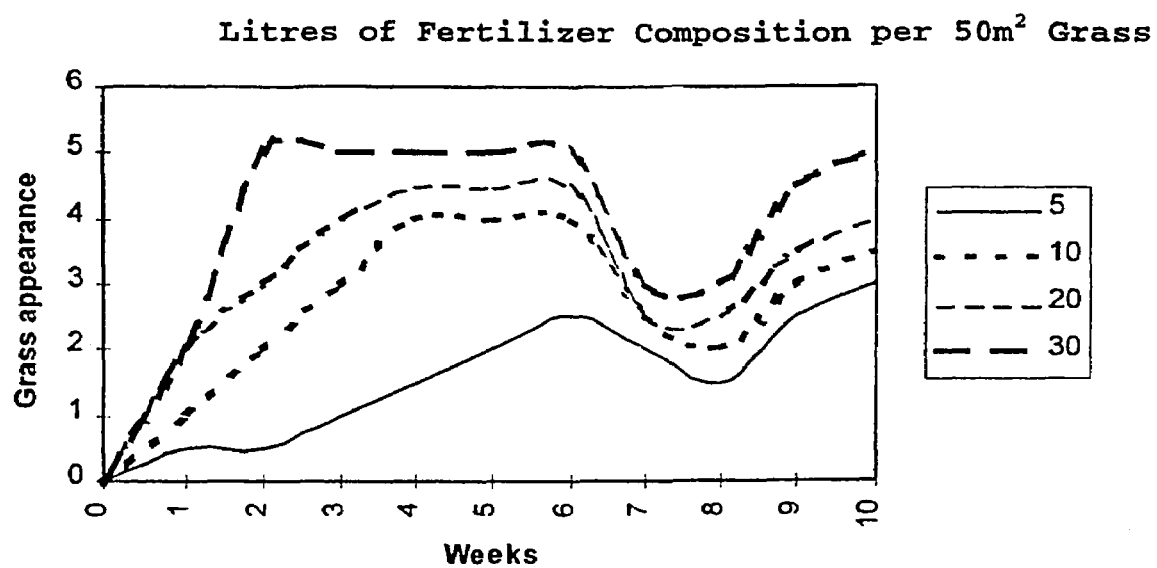
FIG. 3 shows the effect of the fertilizer composition of the invention at different dosage rates on appearance of nursery plots of golf course green turf.

The by-products used in the present invention may be obtained from a number of steps in the brewing process. Typical by-product streams from beer brewing processes are shown in FIG. 2. For example, by-products from the "last runnings", "trub" and "spent grain liquor" as shown in FIG. 2 may be used.

In the brewing industry, the term "last runnings" equates to the residual liquor remaining in the lauter tun, which is around 1-2% of brewlength. The lauter tun is used in the brewing process to extract fermentable sugars from the grain. Hot liquor is sparged on top of the grain bed, which extracts fermentable sugars as it percolates through the grain bed. When the extract from the grain reaches a level of approximately 2° P, the run off is stopped, and the remaining liquor is sent to drain ("last runnings"). The last runnings is a major constituent of trade waste within the brewing industry, with a BOD level around 50,000 mg/L. The term "trub" is known in the brewing industry to represent the high protein fraction that is separated via the central part of a whirlpool, and collected in a weir. Typically, this fraction represents around 1-2% of brewlength, and is usually collected and sent off site with spent grain.

The term "spent grain liquor" is often referred to in the industry to include any by-product after extraction of the fermentable sugars has been completed in the lauter tun. The residual grain is transferred to large hoppers and taken off site for animal feed. The grain after extraction is typically around 20% w/w solids content, and is screwed from the lauter tun to the hoppers. During this phase liquid drains from the screws (typical BOD, 50,000 mg/L), concentrating the grain to approximately 22% w/w. Using enhanced screw press technologies it is possible to concentrate the grain to approximately 35% w/w, and obtain further liquor. The concentrated grain may cause problems in the spent grain hoppers, and bridging technologies or water addition to the grain may need to be considered. The concentrated grain has the potential to reduce the environmental impact of liquor run off in farming areas. However, it potentially can diminish the nutritional value of the spent grain as feed material. It should be noted that, for simplicity, the combination of "last runnings", "trub", and "spent grain liquor" will be ireferred to herein as "spent grain liquor".

The term "malt extract" is interchangeable with the term "brewer's extract". Brewer's extract is obtained from the brewing process. Malt is supplied to the brewery where it is milled, and extracted with hot water. This step relies on endogenous enzyme activity of the malt to break down starch into monosaccharides and dextrins. Insoluble material, including the spent grain is separated from the extract by filtration using a device such as a Lauter Tun. The solids are recovered. This material contains approximately 15% solids plus solution.

The free flowing liquid is recovered by coarse separation technology to yield a suspension that contains in solution, cations, carbohydrates, sugars, amino acid peptides, polyphenols and many other compounds. This liquid suspension is similar to what is known as malt extract. The suspension contains fine material that consists mainly of insoluble protein and carbohydrate. There are also growth factors in this material. The suspension is a source of assimilable nutrients and growth factors (a carry-over from the malting process) plus insoluble material that can be broken down to yield soluble peptides, amino acids and sugars, over time, by chemical or microbial mechanisms. The brewer's extract also contains a-naturally occurring population of microorganisms, such as *Lactobacilli* spp and *Pediococcus* spp.

Throughout the specification the term "fertilizer composition" is used to refer to the soil conditioner, fertilizer and fungicide compositions of the present invention. However, it will be appreciated that while the term "fertilizer composition" is used, the compositions of the present invention do not just provide those chemicals or constituents normally associated with a fertilizer. As described herein, the soil conditioner, fertilizer and fungicide compositions of the present invention comprise a number of constituents, not just chemicals, and acts to improve not only the plant growth, but also acts to improve the soil and rhizosphere. However, for convenience the term "fertilizer composition" has been used rather than soil conditioner, fertilizer and fungicide compositions. It should also be noted that if the trialed fertilizer composition has been supplemented with bacteria, yeast extract or other additives, then these are shown as "fertilizer composition plus bacteria" or "fertilizer composition plus yeast extract" or the like.

It will be appreciated by those skilled in the art that many techniques for mixing, concentrating, or drying the fertilizer composition may be employed. For example, the solid and/or liquid components of the spent grain liquor may be mixed in batch systems using mechanical agitators, impellors, blenders, mixers and the like. Alternatively, mixing may be performed using in-line static mixers or other well-known continuous systems for mixing.

Drying of the fertilizer composition may involve any of the known drying processes including spray drying (either nozzle or rotary atomisers), ring drying, belt drying, oven drying or rotary vacuum drying.

While the fertilizer composition of the present invention is preferably made from malt extract or spent grain liquor as defined herein, it will be appreciated by those skilled in the art that additives to this composition may be employed. For example, as detailed below, the fertilizer composition may be supplemented with yeast cell extracts including glucans, or glucan-like products. Moreover, beneficial bacteria may be incorporated into the liquid or dried form of the fertilizer composition. These may be mixed into the liquid form before drying, or alternatively, added to the dried form of the fertilizer composition after drying. The yeast cell extract or bacteria may be in liquid form or dried. For example, the bacteria may be in concentrated "liquid" form that is absorbed by the dried fertilizer composition. Alternatively, the bacteria may be freeze-dried, and added as a "powdered" form. A further method may involve spray drying bacteria preparation on to the dried powder.

Other additives that may be used in the fertilizer composition of the present invention include surfactants that assist in water penetration, hormones to assist in propagation and plant growth, and binding agents to assist in water retention.

The present invention will now be further described by way of reference only to the following non-limiting examples. It should be understood, however, that the examples following are illustrative only, and should not be taken in any way as a restriction on the generality of the invention described above.

While the majority of the examples in this specification are directed towards turf production, this is a representative application only, and those skilled in the art will appreciate that the fertilizer composition may be applied to other monoculture crops, especially cereal, vegetable and sugar cane crops, as well as in ornamental, forestry or horticultural plant production.

The malt extract or spent grain liquor used in the examples is preferably obtained from a brewing process. However, similar by-products and natural products may also be used. For example, molasses, waste from sugar refining, digested vegetable and animal matter (blood, tissue and the like), milk, powdered milk, extracted grape skins, digested grain husks, waste from the malting process and potato waste, could all be used as the untreated product, or following enzymatic pre-treatment or blending. It will be appreciated that a mixture of one or more such components could be used.

EXAMPLE 1

Recovery of Spent Grain Liquor to be Used as a Fertilizer Composition

Malt was milled and extracted with hot water in the usual way for beer brewing. This step relies on endogenous enzyme activity of the malt to break down starch into monosaccharides and dextrins. Insoluble material, including the spent grain, was separated from the Wort extract by filtration using a Lauter tun.

A number of processes exist for de-watering of spent grain; however the importance of the insoluble phase in the final fertilizer required that the process selected did not over clarify the product. De-cantering was very effective in de-watering the spent grain from 20 to 35% w/w; however the clarified liquid product which resulted was less effective then desired. Accordingly, we investigated other means, and found that the most effective equipment for de-watering the spent grain liquor without reducing the residual insoluble material was a screw press.

The screw press used consisted of a screw that pressed the grain against a pressure head. Liquid that was present drained through a perforated screen that surrounded the screwing device. The pressure required at the head of the screw was obtained via application of high air pressure; however, an alternative source could be a fixed pressure loaded spring. The de-watered grain was transferred to spent grain hoppers, and if required, additional water was added before transportation to the hopper and final discharge.

The free-flowing liquid (spent grain liquor) that was recovered from the spent grain by the above process, yielded a suspension that contained approximately 5-20% v/v of insoluble material. These particles were approximately <500 micron in diameter. As presented in the following examples, we found that the spent grain liquor prepared by this method was useful as a soil conditioner, fertilizer and fungicide composition as is, or it could be supplemented with yeast extract or other additives (see Example 3), or inoculated with additional bacteria (see Example 4). We also found that it could be concentrated or dried to achieve a more readily handled product (see Example 2). The drying process could be performed before or after the addition of the yeast extract or bacteria.

The fertilizer composition typically contained cations, carbohydrates, sugars, amino acids, peptides, vitamin A, thiamine, riboflavin, niacin, vitamin B12, vitamin C, vitamin B6, gibberellins and polyphenols. The fertilizer composition may also contain fine material, mainly insoluble protein and carbohydrate. The fertilizer composition may further contain a naturally occurring population of microorganisms, including *Lactobacilli* spp and *Pediococcus* spp, which are antagonistic to fungal pathogens. The constituents of a typical fertilizer composition liquid suspension is shown in Table 1.

TABLE 1

| Constituents of Fertilizer Composition | |
|---|---|
| Fine solids; | |
| Total phosphorus | 0.05% (w/w) |
| Total potassium | 0.1% (w/w) |
| Total nitrogen | 6.4-7% (w/w) |
| Total protein (approx. W × 6.25) | ~40% (w/w) |
| Total carbohydrate (fermentable) | ~1% (w/w) |
| Holding solution | |
| Total phosphorus | 0.01% (w/w) |
| Total potassium | 0.03% (w/w) |
| Total nitrogen | 0.7% (w/w) |
| Total protein (approx. W × 6.25) | 4.4% (w/w) |
| Total carbohydrate (fermentable) | 4% (w/w) |

EXAMPLE 2

Powdered Fertilizer Composition

While we believed that the liquid suspension fertilizer composition from Example 1 was extremely useful, we considered that its shortened shelf-life, and dilute nature may adversely affect its commercial success. Indeed, we considered that the most convenient form for most applications of this product would be as a powder. Accordingly, in order to improve the shelf-life, and volume of the fertilizer composition suspension from Example 1, we undertook tests to ascertain whether the removal of significant quantities of liquid could be achieved without losing efficacy of the fertilizer composition.

Commercial drying is one of the least cost effective methods of removing liquid. In general, removal of liquid in industrial processes is by mechanical means. However, we felt that both the soluble phase and insoluble phases of the by-product streams were required for the fertilizer composition of the present invention. Accordingly, we tried to avoid the use of mechanical means of removing the liquid. We considered that thermal evaporation using vacuum was a more efficient process than most commercial drying techniques. However, the combined liquid stream, when passed through a thermal evaporator, was extremely difficult to dry, and only a 2:1 concentration was possible. Attempts to alter the by-product streams using pH and temperature were unsuccessful in achieving greater than this concentration.

To solve this problem we tried de-canting the combined streams. We found that this resulted in two phases, the insoluble with approximately 25% w/w, and a soluble fraction (3% w/w). After de-canting, the soluble phase could be evaporated much more readily, and we found that this could be concentrated 10:1. Further clarification of the liquid using a disc stack centrifuge allowed the liquid fraction to be concentrated with a 20:1 ratio. However, the capital impact of such a process made only the de-canting stage possible. A typical analysis of the resultant sludge is given in Table 2.

TABLE 2

Typical Analysis of Decanted Sludge

|  | Sludge |
| --- | --- |
| Chemical Analysis | |
| Moisture % w/w | 76.0 |
| Solids % w/w | 24.0 |
| Ash % w/w | 0.7 |
| Crude Fat % w/w | 3.2 |
| Nitrogen % w/w | 1.7 |
| Protein % w/w (N × 6.25) | 10.6 |
| Carbohydrate % w/w (by difference) | 9.5 |
| Crude Fibre % w/w | 0.5 |
| Cations mg/kg | |
| Calcium | 320 |
| Phosphorous | 1300 |
| Potassium | 32 |
| Sodium | 20 |
| Trace Elements mg/kg | |
| Antimony | <0.5 |
| Arsenic | <0.5 |
| Barium | 2.3 |
| Beryllium | <0.5 |
| Cadmium | 0.02 |
| Chromium | 0.9 |
| Cobalt | <0.5 |
| Copper | 5.2 |
| Lead | 0.7 |
| Mercury | <0.05 |
| Molybdenum | 0.8 |
| Nickel | 0.2 |
| Selenium | <0.5 |
| Tin | 0.7 |
| Vanadium | 0.2 |
| Zinc | 20 |

The sludge that resulted from de-canted insoluble material was typically around 25% w/w total solids. This material was later mixed with the liquid concentrate.

We tried two types of evaporators, namely, falling film and scraped surface evaporators. Both types of evaporators were found to provide similar evaporation rates. However, we found that concentration above the levels suggested above led to pumping difficulties.

We mixed the sludge from the decanter and liquid concentrate from the evaporator at a rate of approximately 1:1. The mixing of the sludge and liquid concentrate was carried out using a high-speed mixer en route to a storage tank. However, we consider that the same product could be obtained using a static mixer in a continuous system. The tank was continuously circulated with in line heating to maintain 70° C. Heat transfer within this solution was expected to be poor. The solution had a viscosity at 70° C., of approximately 1500 cP, and therefore significant drops in temperatures would have resulted in pumping difficulties.

We found that the total solids content of the resultant paste was around 27% w/w. This compared with well with the initial solids content of the combined liquid streams of only 6% w/w. Therefore, we were able to achieve an overall concentration factor of 4.5:1. While we noted that the 27% w/w solids content of the paste was still not ideal for use in commercial dryers, attempts to further release water via other thermal or chemical means proved unsuccessful. pH treatment or increase in temperature of the solutions did not greatly affect the viscosity, which indicated that this paste would not release its water molecules readily. Despite these problems we decided that attempts to dry the paste should still be undertaken.

We considered that drying of the paste could be undertaken using any number of different types of drying technologies, including spray drying (either nozzle or rotary atomisers), ring drying, belt drying, oven drying or rotary vacuum drying. We found that spray drying resulted in significant water addition to make the technology viable; however the water addition using rotary atomisers made the economics of such a technique non-viable. We considered that nozzle atomisers may have problems due to granular material blocking the nozzles. Belt drying, oven drying and rotary vacuum drying were all considered to potentially have the same problem ie requiring further downstream processing to produce a sufficiently fine powder for commercialisation.

We found that the best drying technique for the paste was ring drying as it produced a suitable powder without the problems discussed above. However, ring drying was found to work only when using a high re-cycle rate (80-90%) because of the 'sticky' nature of the paste. The high recycle rate ensured that the sticky nature of the paste was reduced as a problem due to the dry powder absorbing the moisture of the incoming paste making it more manageable. The finished powder was easily redissolved in water. A comparison of the fertilizer composition suspension as described in Example 1 with the powdered fertilizer composition is shown in Table 3.

TABLE 3

Comparison of the Gross Nutrient Profile of Liquid Suspension and Powdered Fertilzer Compositions

| Gross Nutrient Profile | Suspension | Powder |
| --- | --- | --- |
| NPK (% w/w) | | |
| Nitrogen | 0.42 | 3.95 |
| Phosphorous | 0.04 | 0.41 |
| Potassium | 0.02 | 0.17 |
| Cations (ppm) | | |
| Calcium | 110 | 835 |
| Sodium | 230 | 180 |
| Magnesium | 110 | 1300 |
| Anions (ppm) | | |
| Chloride | 730 | 9700 |
| Sulphate | 35 | 800 |
| Nitrate | 2 | 4 |
| Nitrite | <0.5 | 90 |
| Trace Metals (ppm) | | |
| Antimony | <0.1 | 0.4 |
| Arsenic | <0.1 | <0.1 |
| Barium | 0.7 | 7.4 |
| Beryllium | <0.1 | <0.1 |
| Boron | 0.4 | 5.4 |
| Cadmium | <0.01 | <0.01 |
| Chromium | 0.2 | 2.6 |
| Cobalt | <0.1 | <0.1 |
| Copper | 1 | 10 |
| Iron | 9 | 88 |
| Lead | <0.05 | 0.3 |
| Manganese | 3 | 23 |
| Mercury | <0.05 | <0.05 |
| Molybdenum | 0.2 | 1.9 |
| Nickel | <0.1 | 0.2 |
| Selenium | <0.1 | 0.1 |

TABLE 3-continued

Comparison of the Gross Nutrient Profile of Liquid
Suspension and Powdered Fertilzer Compositions

| Gross Nutrient Profile | Suspension | Powder |
|---|---|---|
| Sulphur | 330 | 3350 |
| Tin | 0.2 | 1.5 |
| Vanadium | <0.05 | 0.7 |
| Zinc | 4 | 33 |
| Total Polyphenols (ppm) | 80 | 1450 |

EXAMPLE 3

Yeast Extract and Yeast Cell Wall Preparation

As discussed above, the fertilizer compositions described in Examples 1 and 2 may be supplemented with yeast extract. Commercially available yeast extract preparations may be used; however, suitable yeast extract was also produced by the following methods.

Yeast suspensions were adjusted to pH 12 with an appropriate amount of concentrated HCl or NaOH solution. Chloroform (3% v/v final) was added, and the volume was adjusted to give a packed cell volume of 200 ml/L. The mixture was then agitated and heated to 45-50° C. for 24 hours. The soluble material was recovered by centrifugation at 5,000 g for 10 min. Other suitable means could be used, for example, filtration. The recovered material was then spray dried directly, or concentrated using a surface swept evaporator before spray drying. Alternatively, the entire suspension after the heating step was dried.

Washed yeast suspensions were also prepared by adjusting to pH 9 and volume to 200 ml/L. Commercial protease (Pancreatin, Esperase at 0.2% dosage rates (v/v)) was added to the stirred suspension and allowed to incubate at 60° C. for 6 hours, while the pH was maintained at >11 by periodic addition of NaOH solution.

Yeast cell wall preparations were made as described in Patent Application Number WO97/02356, the entirety of which is incorporated herein by reference.

EXAMPLE 4

Bacterial Preparation

As discussed previously, the fertilizer compositions described in Examples 1 and 2 maybe inoculated with beneficial bacteria. Bacteria were prepared by standard procedures. For example, *Bacillus subtilis* was maintained on agar slopes at 4° C.; the original stock culture was stored at −80° C. in 50% glycerol. A shake flask of *B. subtilis* was prepared by inoculating a loop into nutrient broth. The cells were added to 20 liters of medium containing 1% malt extract, 0.1% yeast extract in 0.01M potassium phosphate buffer pH 6.5. A plastic fermenter vessel was used, and was typically a container fitted with inlet and exit ports for gas, and sterile filters in-line. The fermenter was sterilised using metabisulfite, and reverse osmosis water was passed through a Gelman 0.2 micron filter prior to addition to the vessel. The nutrients used in the fermenter were dissolved in 2 liters of water and autoclaved at 121° C. for 15 min and then added to the vessel. The vessel was inoculated with the bacteria and held at 30° C. in a constant temperature room for up to 3 days. The final cell density was typically $10^{10}$ cell/ml. Once the cells had entered stationary phase the vessel was shifted to a cold room at 4° C. The cells were allowed to settle out over about 24 h, although faster recoveries were sometimes obtained by adding silica gel (5 g/liter, pH of the culture medium adjusted to 5). The cells were recovered from the culture medium by standard procedures.

*Derxia gummosa*, *Azotobacter beijerinckii*, *Pseudomonas fluorescens* and *Bacillus thuringiensis* were all grown in the same medium and under the same conditions as described for *B. subtilis*.

EXAMPLE 5

Supplemented Fertilizer Compositions

A supplemented composition comprising the fertilizer composition liquid suspension disclosed in Example 1, with a bacterial mixture as described in Example 4 was prepared as follows. Approximately $10^8$-$10^{12}$ organisms of each organism described in Example 4 were inoculated into the fertilizer composition liquid suspension. The supplemented composition was prepared by mixing 1 liter (Low dose) or 5 liters (High dose) of each bacterial suspension with 30 liters of fertilizer composition liquid suspension. The Low dose recipe provided about $3 \times 10^{12}$ of each organism per liter. The High dose was 5 times greater.

EXAMPLE 6

Yeast Extract Supplementation

The fertilizer composition liquid suspension from Example 1 was supplemented with yeast extract produced by the method described in Example 3. The yeast extract powder (2.5 kg dry weight/tonne) was found to provide peptides, sugars, nucleosides, and nucleotides by addition of yeast extract powder.

It was also fortified with yeast cell wall material, which contains immunostimulants including glucans, by the addition of cell wall glucan (1 kg dry weight/tonne) prepared according to the method disclosed in WO97/02356.

EXAMPLE 7

Effect of Nutrient Applications on the Multiplication of Soil Bacteria

Preliminary experiments were undertaken to determine if yeast extracts and carbohydrate solutions could be used as nutrient sources to promote bacterial growth in soils. Bent grass was obtained from a commercial supplier and grown under lights in a sand/soil mixture in polystyrene containers (19×22×10 cm). Grass samples were dosed with yeast extract and bacteria (*B. subtilis*) in various combinations, samples were assayed 10 days after the treatments. The results are shown in Table 4.

TABLE 4

Total bacterial counts and *Bacillus* counts in soils with or without added bacteria and/or added yeast extract.

| | Total Count | | | | *Bacillus* count | | | |
|---|---|---|---|---|---|---|---|---|
| Origin of | Sample 1 | | Sample 2 | | Sample 1 | | Sample 2 | |
| soil sample | $10^{-5}$ | $10^{-6}$ | $10^{-5}$ | $10^{-6}$ | $10^{-5}$ | $10^{-6}$ | $10^{-5}$ | $10^{-6}$ |
| Grass; no added bacteria; no added yeast extract | 200 | 32 | 80 | 19 | 72 | 12 | 26 | 8 |

TABLE 4-continued

Total bacterial counts and *Bacillus* counts in soils with or without added bacteria and/or added yeast extract.

| | Total Count | | | | *Bacillus* count | | | |
|---|---|---|---|---|---|---|---|---|
| Origin of | Sample 1 | | Sample 2 | | Sample 1 | | Sample 2 | |
| soil sample | $10^{-5}$ | $10^{-6}$ | $10^{-5}$ | $10^{-6}$ | $10^{-5}$ | $10^{-6}$ | $10^{-5}$ | $10^{-6}$ |
| Grass; added bacteria; no yeast extract | 90 | 33 | 60 | 12 | 48 | 11 | 31 | 6 |
| Grass; added bacteria; added yeast extract | TNC | 200 | TNC | 160 | TNC | 160 | TNC | 100 |

TNC—too numerous to count.

Sample 1 and Sample 2 represent typical samples from 10 replicates. Initially the grass samples had comparable bacterial counts in the top 2 mm subsoil stratum, about $10^7$ cfu/g soil. If bacteria were added without yeast extract, there was little change in the soil bacterial population. If both yeast extract and bacteria were added at the same time, there was a significant increase in the cell number. The increase in bacterial population was due in part to an increase in the number of Bacilli. However, if the addition of yeast extract-containing solution was delayed by 5 days there was no significant increase after a further 5 days of incubation.

These data indicate that the viability of the added bacteria is dependent upon the addition of significant amounts of nutrients and vitamins in the yeast hydrolysate. Similarly, the addition of molasses to grass samples did not significantly alter the measured total microbial population. When molasses solution was added together with *Bacillus* spp there was an increase in the microbial population. However, the dramatic increase outlined in the table above required the addition of the yeast extract as well. Preliminary data also indicated that the presence of glucans enhanced the effect. For example, clarified yeast hydrolysate was not as effective as the unseparated digested yeast suspension. Substitution of fertilizer composition liquid suspension for molasses, which contains little soluble or insoluble protein, had an effect comparable to that of molasses plus yeast extract.

The condition of the turf patches after the addition of yeast extract or yeast extract plus molasses was considered luxuriant, and rated more highly when bacteria were also included in the dosing regime.

EXAMPLE 8

Effect of Dosage Rate of Fertilizer Composition on Nursery Test Plot of Golf Course Turf The fertilizer composition as described in Example 5 was applied to a test plot at Huntingdale Golf Course, Melbourne, Australia. The nursery test plot consisted of commercial bent grass, which was not pre-soaked, was in good condition, and was mowed after 4 weeks of application. The trials were carried out in duplicate during January and February 1999, i.e during the hottest summer months. The individual trial plots had a 50 m² surface area in an open location. No fungicidal or fertiliser treatments were applied during the trial periods. The appearance was rated on a scale of 1 to 5, with 1 being brown, patchy appearance and 5 being a lush, dark green appearance. The watering and dosage were stopped after 6 weeks of regular weekly dosing plus watering. After 2 weeks the watering, but not the application of fertilizer composition was resumed.

The nursery test plot was divided into a control panel and 4 test plots, each of which was treated with a different amount of the fertilizer composition—5, 10, 20 and 30 liters/50 m² of turf. The untreated nursery test plot was in reasonable condition and had been mown, but was rated at 1. The fertilizer composition was administered by hand-held spray. Between 10 and 60 liters per 100 m² surface area of turf was applied, using approximately 50 liters of water as the diluent and carrier feed to the spray. The applications commenced on the first day of the first week and thereafter were effected one week apart. Samples of the grass were removed, photographed and analysed chemically. The samples were analysed for i) appearance, ii) soil chemistry, and iii) microbial flora.

Prior to application of the fertilizer composition the test area was uniform in appearance, and had a rating of 1. Shortly after the treatment commenced there was a noticeable greening of the area treated with the highest amount of the fertilizer composition, and thereafter of the other test areas in order of increasing dosage rate. Initially the turf was rather thin, and the thatch layer was very apparent as a brown background. Within three weeks, the treated areas were appearing greener and thicker ie had a reduced brown background compared to the control area. This was particularly apparent after about a month of treatment. All the treated turf areas were greener and more luxuriant than the control. After mid-February the area was not watered and its appearance deteriorated; the green foliage appeared to die away and the underlying brown thatch area was very visible. Watering resumed later in February, and the appearance of the whole area began to improve, but it was very apparent that the turf in treated area and especially the high dosage area revived at a much faster rate and became significantly thicker and greener that the other areas.

These observations have been quantitated in Table 5 on the basis of a quality rating from 1 to 5.

TABLE 5

Results of Trial of Dosage rates of Fertilizer Composition on Golf Course Nursery Test Plots

| | | Test Plots | | | |
|---|---|---|---|---|---|
| Date | Control | 5 L/50 m² | 10 L/50 m² | 20 L/50 m² | 30 L/50 m² |
| 7 Jan. 1999 | 1 | 1 | 1 | 1 | 1 |
| 11 Jan. 1999 | 1 | 1 | 1 | 2 | 2 |
| 13 Jan. 1999 | 1 | 1 | 2 | 2 | 3 |
| 15 Jan. 1999 | 1 | 1 | 3 | 3 | 3 |
| 20 Jan. 1999 | 1 | 2 | 3 | 4 | 5 |
| 25 Jan. 1999 | 1 | 2 | 3 | 4 | 5 |
| 27 Jan. 1999 | 1 | 3 | 4 | 5 | 5 |
| 10 Feb. 1999 | 1 | 4 | 4 | 5 | 5 |
| 15 Feb. 1999 | 2 | 4 | 4 | 5 | 5 |
| 23 Feb. 1999 | 1 | 1 | 1 | 1 | 1 |
| 4 Mar. 1999 | 1 | 2 | 3 | 3 | 4 |

A 1 rating was assigned to the appearance of the test plot prior to any treatment. The highest rating of 5 was given to the grass plot that received a sustained treatment of 30 liters of fertilizer composition per 50 m² of area.

The latter plot rapidly reached the 5 rating after the trials started, and maintained this rating until the watering maintenance was halted. The rating improved noticeably after the watering recommenced. The areas treated with lower dosage rates also increased in quality quite rapidly once watering was resumed, and after 5 weeks there was little difference between the plots receiving 20 and 30 liters/50 m². However it was noticeable that during the recovery period after the watering had recommenced the higher dosed plot outperformed the others.

Figure 4A:
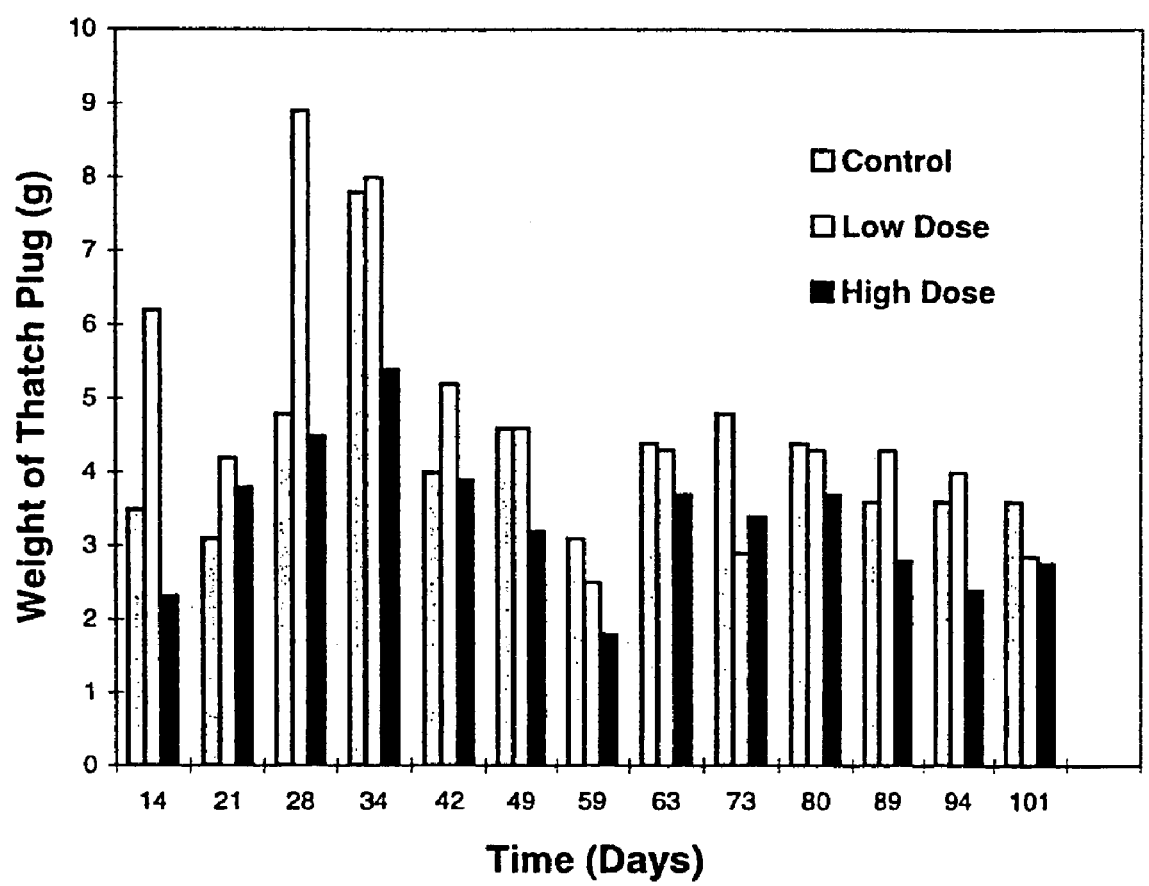
FIG. 4a shows the effects of the fertilizer composition of the invention on the thatch layer content of nursery plots of golf green turf.
Figure 4B:
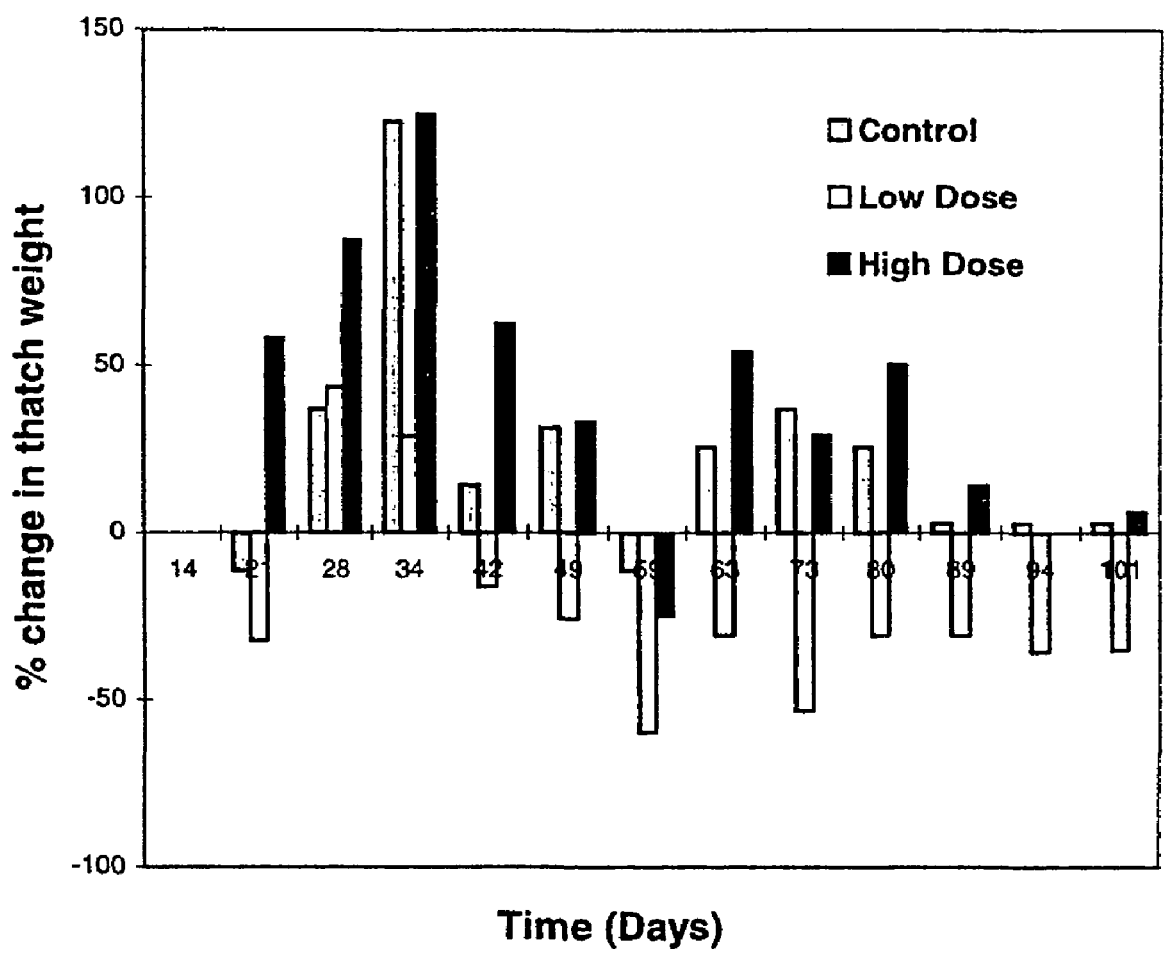
FIG. 4b shows the differential change in thatch content of the plots following treatment with the fertilizer composition of the invention.

The thatch layer in the nursery plot extended down about 15 mm below the foliage. It was not continuous but resembled a series of layers that were loosely connected together. As shown in FIGS. 4a and 4b, there was some indication that after treatment the layers shrank in size or thickness and that the soil content in this section tended to increase. However, the effect was not consistently observed when plugs were examined, and it was therefore not clear whether the application of the fertilizer composition had a significant effect on the reduction of the thatch layer over the short time period of the trial.

EXAMPLE 9

Chemical Analysis of Samples from Nursery Plots

Turf plugs from representative plots of treated turf and control turf described in Example 8 were taken and sectioned cylindrical. Sections (40 mm×150 mm) were then taken from the trial plots and sectioned vertically into three sections referred to as top, middle and bottom. These sections were analysed for Cation Exchange Capacity (CEC), Total phosphorus (P.), Total potassium (K), Total nitrogen (N) and Total organic carbon.

The CEC gave an estimate of the number of charged sites in the soil capable of binding cations. Higher the value means that the soil is more effective in the retention of nutrients. N, P and K have the usual meaning and importance in relation to plant nutrition. Total organic carbon gave some indication of the accumulation of organic material together with carbon fixed as a result of microbial activity and propagation.

Figure 5:
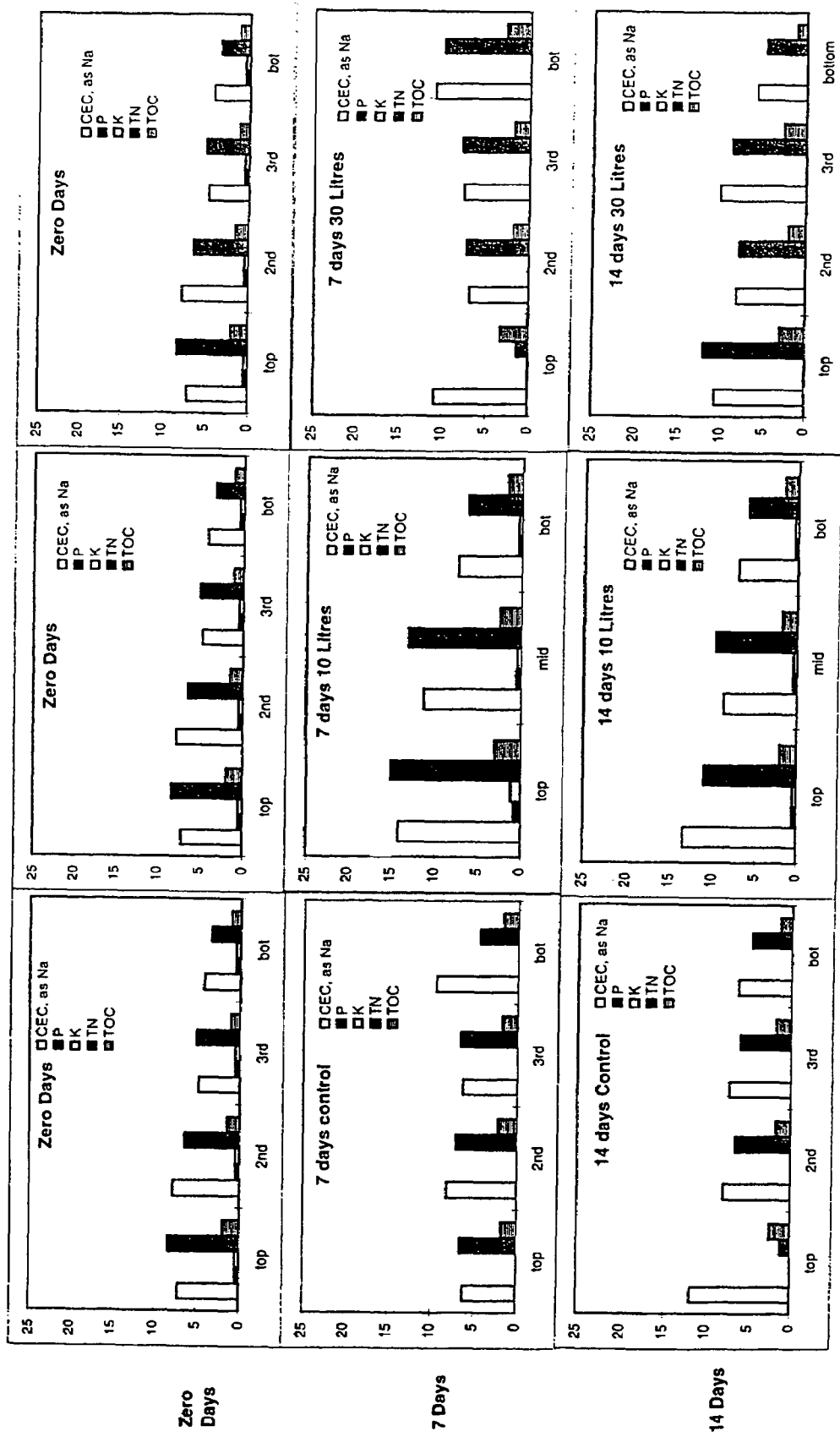
FIG. 5 shows the results of a comparative analysis of the soil chemistry of the turf plugs taken following treatment of nursery plots of golf course green with the fertilizer composition of the invention.
Figure 5:
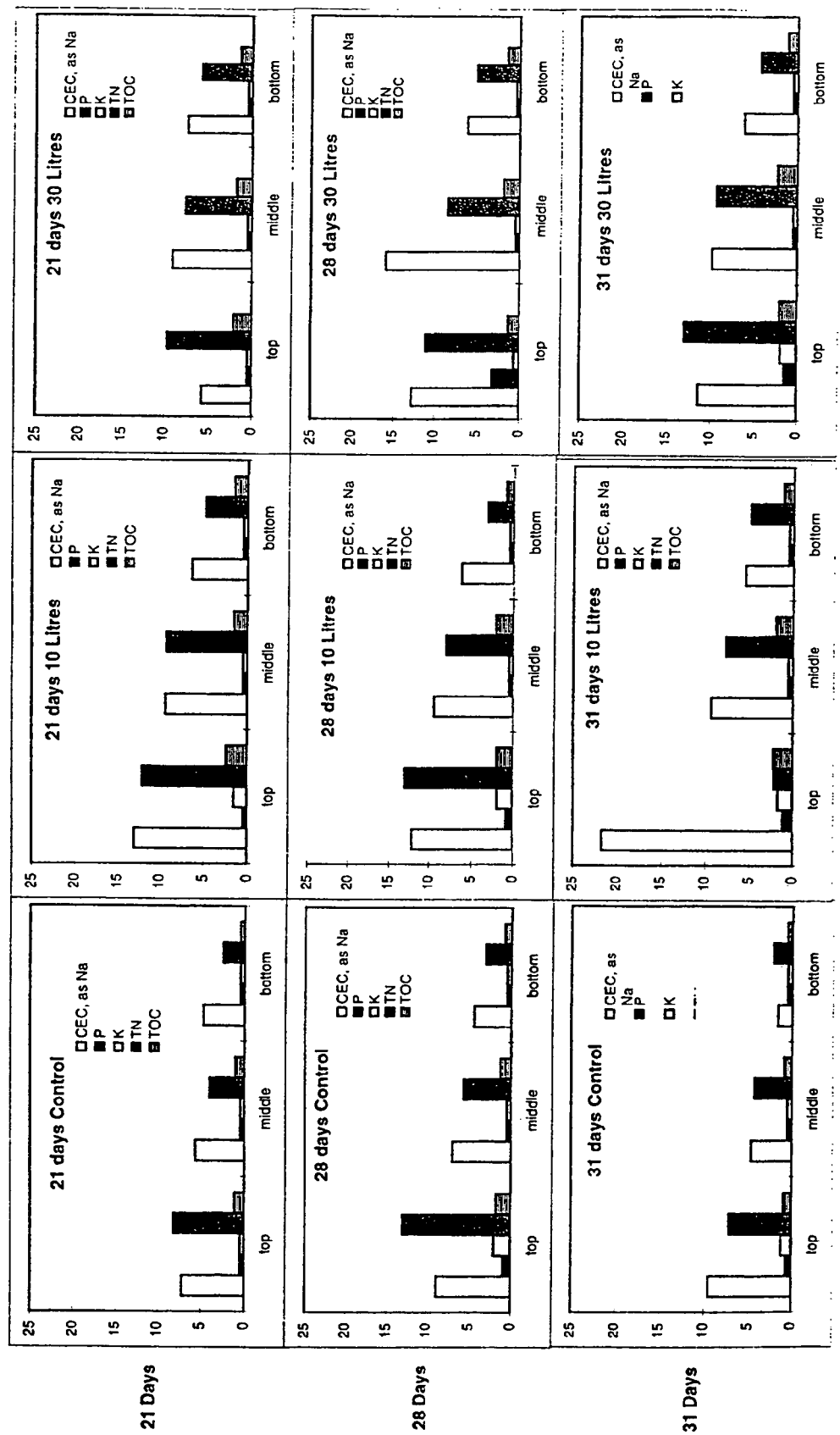
Figure 5:
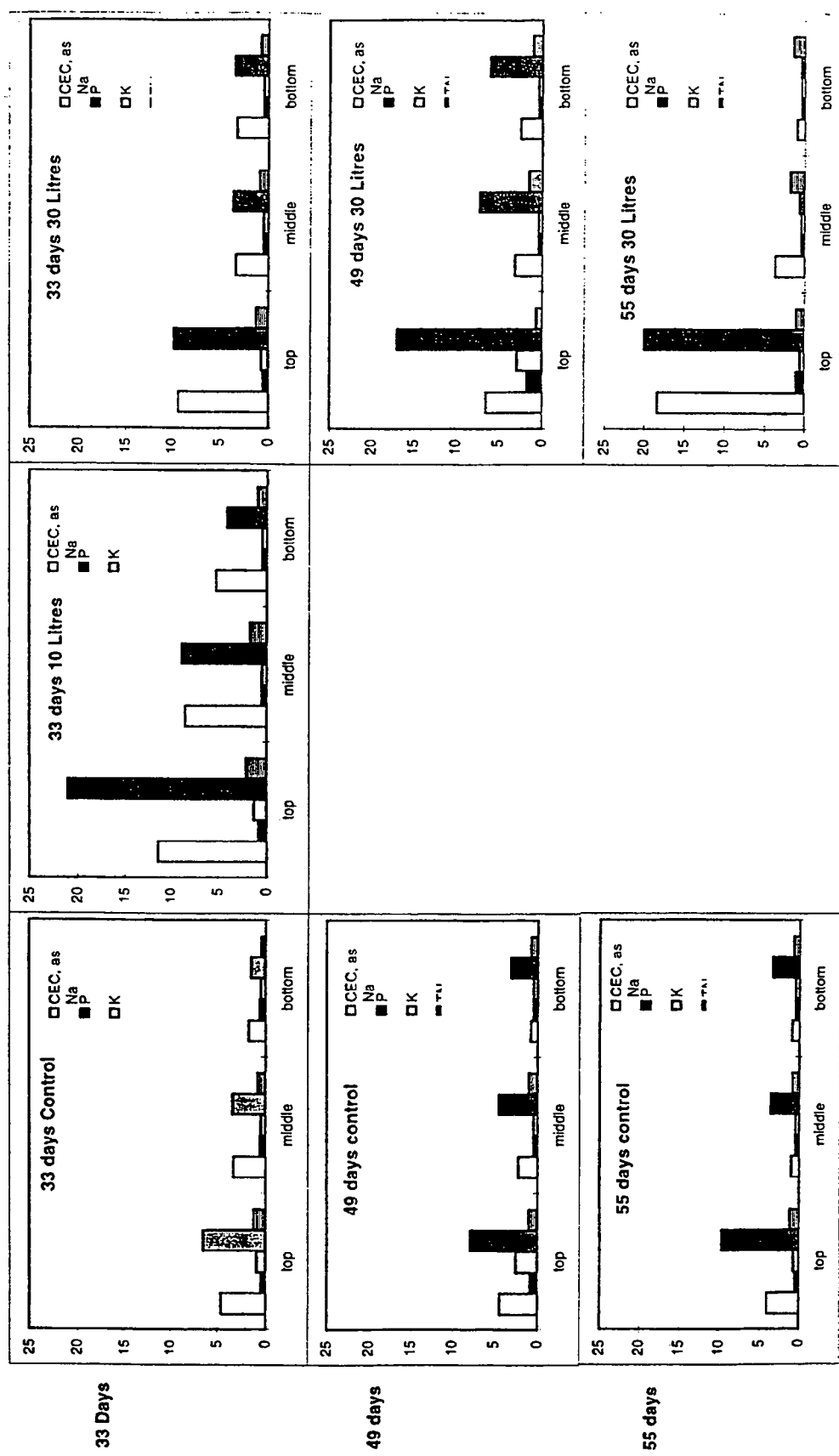
Figure 5:
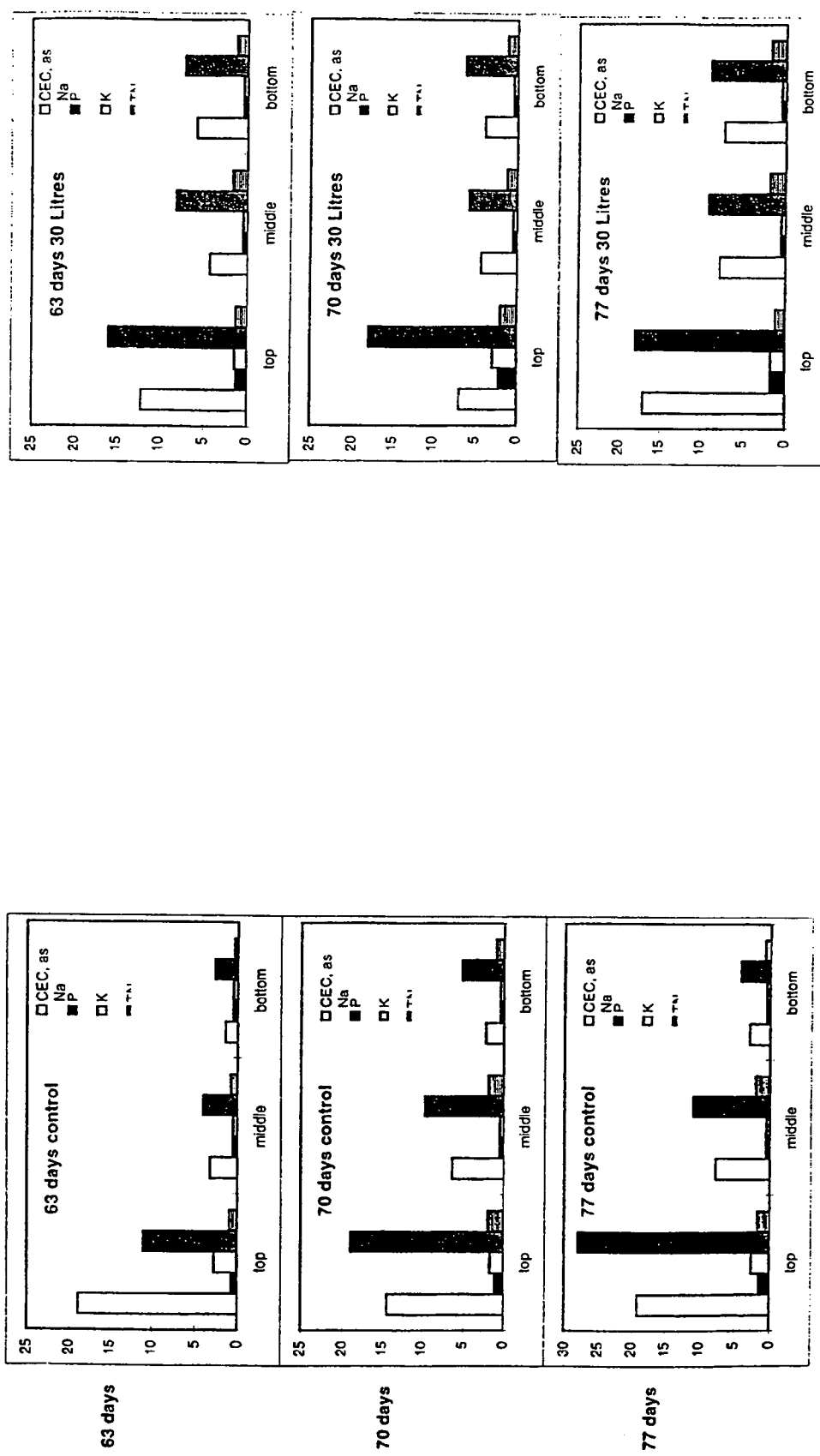

The data was obtained by analysing single plugs from representative plots of treated turf. FIG. 5 provides a chronological series of histograms for the application of 10 L and 50 L/50 m² of fertilizer composition compared to a control, and Table 6 presents the raw data. In FIG. 5 the days refer to days after treatment. The liters refers to the number of liters of fertilizer composition applied to ~50 m² trial plot area. The fertilizer composition was applied every 7 days. The trial plot area was watered, but received no other fertilizer applications for the duration of the sampling period. Abbreviations: CEC (Cation Exchange Capacity, mequiv Na/100 g); P (Phosphorus mg/kg); K (Potassium mg/kg); TN (Total Kjeldahl Nitrogen mgN/kg); TOC (Total Organic Carbon mg/kg).

TABLE 6

Results of Chemical Analysis of Turf Plugs from Nursery Plots

| Date | Time | Application | Section | CEC, as Na | CEC, dry | P (dry) | K (dry) | Nitrate (dry) | Nitrite (dry) | TN (dry) | Moisture | TOC |
|---|---|---|---|---|---|---|---|---|---|---|---|---|
| 8 Jan. 1999 | initial | — | top | 5.9 | 7.1 | <50 | <50 | <5 | <5 | 830 | 16.7 | 1.99 |
| 8 Jan. 1999 | initial | — | 2nd | 6.8 | 7.7 | <50 | <50 | <5 | <5 | 640 | 12 | 1.5 |
| 8 Jan. 1999 | initial | — | 3rd | 4.2 | 4.7 | <50 | <50 | <5 | <5 | 500 | 10.9 | 1.09 |
| 8 Jan. 1999 | initial | — | bottom | 3.7 | 4.1 | <50 | <50 | <5 | <5 | 330 | 9.4 | 1.09 |
| 15 Jan. 1999 | 7 days | control | top | 5.5 | 6.2 | — | — | <5 | <5 | 660 | 11 | 1.74 |
| 15 Jan. 1999 | 7 days | control | 2nd | 7.3 | 8.1 | — | — | <5 | <5 | 710 | 9.8 | 2.15 |
| 15 Jan. 1999 | 7 days | control | 3rd | 5.8 | 6.3 | — | — | <5 | <5 | 660 | 8.5 | 1.75 |
| 15 Jan. 1999 | 7 days | control | bottom | 8.6 | 9.5 | — | — | <5 | <5 | 440 | 9.7 | 1.69 |
| 15 Jan. 1999 | 7 days | 10 L/50 m² | top | 12 | 14.1 | 81 | 110 | <5 | <5 | 1500 | 14.9 | 3 |
| 15 Jan. 1999 | 7 days | 10 L/50 m² | mid | 10 | 11.3 | 58 | <50 | <5 | <5 | 1300 | 11.3 | 2.5 |
| 15 Jan. 1999 | 7 days | 10 L/50 m² | bottom | 6.7 | 7.4 | <50 | <50 | <5 | <5 | 650 | 9.6 | 1.7 |
| 15 Jan. 1999 | 7 days | 30 L/50 m² | top | 6.6 | 10.9 | — | — | <5 | <5 | 1400 | 39.4 | 3.27 |
| 15 Jan. 1999 | 7 days | 30 L/50 m² | 2nd | 6.3 | 6.9 | — | — | <5 | <5 | 730 | 9.3 | 1.79 |
| 15 Jan. 1999 | 7 days | 30 L/50 m² | 3rd | 6.8 | 7.6 | — | — | <5 | <5 | 780 | 10.6 | 1.83 |
| 15 Jan. 1999 | 7 days | 30 L/50 m² | bottom | 9.7 | 11.0 | — | — | <5 | <5 | 1000 | 11.5 | 2.84 |
| 22 Jan. 1999 | 14 days | control | top | 8.3 | 11.8 | — | — | <5 | <5 | 1200 | 29.9 | 2.61 |
| 22 Jan. 1999 | 14 days | control | 2nd | 7.5 | 8.1 | — | — | <5 | <5 | 670 | 7.6 | 1.81 |
| 22 Jan. 1999 | 14 days | control | 3rd | 6.8 | 7.4 | — | — | <5 | <5 | 610 | 7.9 | 1.82 |
| 22 Jan. 1999 | 14 days | control | bottom | 6 | 6.4 | — | — | <5 | <5 | 480 | 6.5 | 1.48 |
| 22 Jan. 1999 | 14 days | 10 L/50 m² | top | 12 | 13.4 | 60 | <50 | <5 | <5 | 1100 | 10.6 | 2.1 |
| 22 Jan. 1999 | 14 days | 10 L/50 m² | mid | 8 | 8.8 | <50 | <50 | <5 | <5 | 970 | 8.8 | 1.9 |
| 22 Jan. 1999 | 14 days | 10 L/50 m² | bottom | 6.5 | 7.1 | <50 | <50 | <5 | <5 | 600 | 8.4 | 1.6 |
| 22 Jan. 1999 | 14 days | 30 L/50 m² | top | 7.5 | 10.7 | — | — | <5 | <5 | 1200 | 29.9 | 3 |
| 22 Jan. 1999 | 14 days | 30 L/50 m² | 2nd | 7.2 | 8.2 | — | — | <5 | <5 | 790 | 12.2 | 2.06 |
| 22 Jan. 1999 | 14 days | 30 L/50 m² | 3rd | 9.1 | 10.2 | — | — | <5 | <5 | 880 | 10.9 | 2.67 |
| 22 Jan. 1999 | 14 days | 30 L/50 m² | bottom | 5.3 | 5.9 | — | — | <5 | <5 | 490 | 9.5 | 1.29 |
| 29 Jan. 1999 | 21 days | control | top | 6.4 | 7.2 | <50 | 51 | <5 | <5 | 810 | 11.4 | 1.2 |
| 29 Jan. 1999 | 21 days | control | middle | 5.3 | 5.6 | <50 | <50 | <5 | <5 | 400 | 5.2 | 1.1 |
| 29 Jan. 1999 | 21 days | control | bottom | 4.5 | 4.7 | <50 | <50 | <5 | <5 | 250 | 4.9 | 0.51 |
| 29 Jan. 1999 | 21 days | 10 L/50 m² | top | 11 | 13.0 | <50 | 160 | <5 | <5 | 1200 | 15.1 | 2.5 |
| 29 Jan. 1999 | 21 days | 10 L/50 m² | middle | 8.2 | 9.3 | <50 | <50 | <5 | <5 | 920 | 12.2 | 1.6 |
| 29 Jan. 1999 | 21 days | 10 L/50 m² | bottom | 5.8 | 6.3 | <50 | <50 | <5 | <5 | 480 | 7.8 | 1.5 |
| 29 Jan. 1999 | 21 days | 30 L/50 m² | top | 5 | 5.7 | <50 | 50 | <5 | <5 | 960 | 12.5 | 2.1 |
| 29 Jan. 1999 | 21 days | 30 L/50 m² | middle | 8.1 | 9.0 | <50 | <50 | <5 | <5 | 760 | 9.7 | 1.8 |
| 29 Jan. 1999 | 21 days | 30 L/50 m² | bottom | 6.7 | 7.3 | <50 | <50 | <5 | <5 | 580 | 8.6 | 1.4 |
| 5 Feb. 1999 | 28 days | control | top | 7 | 8.8 | 98 | 260 | <5 | <5 | 1300 | 20.9 | 1.8 |
| 5 Feb. 1999 | 28 days | control | middle | 6.2 | 6.9 | <50 | <50 | <5 | <5 | 570 | 9.8 | 1.3 |
| 5 Feb. 1999 | 28 days | control | bottom | 4.1 | 4.4 | <50 | <50 | <5 | <5 | 300 | 7.3 | 0.78 |
| 5 Feb. 1999 | 28 days | 10 L/50 m² | top | 10 | 12.1 | 86 | 190 | <5 | <5 | 1300 | 17.4 | 1.9 |
| 5 Feb. 1999 | 28 days | 10 L/50 m² | middle | 8.3 | 9.4 | <50 | 50 | <5 | <5 | 800 | 11.9 | 2 |
| 5 Feb. 1999 | 28 days | 10 L/50 m² | bottom | 5.7 | 6.2 | <50 | <50 | <5 | <5 | 310 | 7.8 | 0.91 |
| 5 Feb. 1999 | 28 days | 30 L/50 m² | top | 10 | 12.7 | 320 | 670 | <5 | <5 | 1100 | 21 | 1.3 |
| 5 Feb. 1999 | 28 days | 30 L/50 m² | middle | 14 | 15.9 | <50 | 54 | <5 | <5 | 850 | 12 | 1.9 |

TABLE 6-continued

Results of Chemical Analysis of Turf Plugs from Nursery Plots

| Date | Time | Application | Section | CEC, as Na | CEC, dry | P (dry) | K (dry) | Nitrate (dry) | Nitrite (dry) | TN (dry) | Moisture | TOC |
|---|---|---|---|---|---|---|---|---|---|---|---|---|
| 5 Feb. 1999 | 28 days | 30 L/50 m² | bottom | 5.6 | 6.2 | <50 | <50 | <5 | <5 | 510 | 9.1 | 1.5 |
| 8 Feb. 1999 | 31 days | control | top | 8.7 | 9.5 | 64 | 120 | <5 | <5 | 720 | 8.3 | 0.88 |
| 8 Feb. 1999 | 31 days | control | middle | 4.4 | 4.7 | <50 | <50 | <5 | <5 | 440 | 7.1 | 0.85 |
| 8 Feb. 1999 | 31 days | control | bottom | 1.5 | 1.6 | <50 | <50 | <5 | <5 | 210 | 6.2 | 0.53 |
| 8 Feb. 1999 | 31 days | 10 L/50 m² | top | 17 | 21.7 | 110 | 170 | <5 | <5 | 2100 | 21.7 | 2.2 |
| 8 Feb. 1999 | 31 days | 10 L/50 m² | middle | 8.3 | 9.3 | <50 | <50 | <5 | <5 | 770 | 10.9 | 1.9 |
| 8 Feb. 1999 | 31 days | 10 L/50 m² | bottom | 5.1 | 5.5 | <50 | <50 | <5 | <5 | 490 | 8.1 | 1.1 |
| 8 Feb. 1999 | 31 days | 30 L/50 m² | top | 9 | 11.4 | 140 | 190 | <5 | <5 | 1300 | 20.8 | 2 |
| 8 Feb. 1999 | 31 days | 30 L/50 m² | middle | 8.5 | 9.8 | <50 | <50 | <5 | <5 | 940 | 13.1 | 2.3 |
| 8 Feb. 1999 | 31 days | 30 L/50 m² | bottom | 5.7 | 6.2 | <50 | <50 | <5 | <5 | 420 | 7.8 | 1.1 |
| 10 Feb. 1999 | 33 days | control | top | 4 | 4.6 | <50 | 94 | <5 | <5 | 650 | 13.1 | 1.2 |
| 10 Feb. 1999 | 33 days | control | middle | 3.1 | 3.3 | 57 | <50 | <5 | <5 | 340 | 6.3 | 0.81 |
| 10 Feb. 1999 | 33 days | control | bottom | 1.6 | 1.7 | 60 | <50 | <5 | <5 | 150 | 4.7 | 0.41 |
| 10 Feb. 1999 | 33 days | 10 L/50 m² | top | 7.8 | 11.4 | 81 | 130 | <5 | <5 | 2100 | 31.7 | 2.1 |
| 10 Feb. 1999 | 33 days | 10 L/50 m² | middle | 7.4 | 8.4 | <50 | <50 | <5 | <5 | 880 | 11.4 | 1.7 |
| 10 Feb. 1999 | 33 days | 10 L/50 m² | bottom | 4.7 | 5.2 | <50 | <50 | <5 | <5 | 410 | 8.8 | 0.98 |
| 10 Feb. 1999 | 33 days | 30 L/50 m² | top | 7.8 | 9.2 | 51 | 73 | <5 | <5 | 970 | 15.2 | 1.2 |
| 10 Feb. 1999 | 33 days | 30 L/50 m² | middle | 3.1 | 3.3 | <50 | <50 | <5 | <5 | 360 | 6.4 | 0.88 |
| 10 Feb. 1999 | 33 days | 30 L/50 m² | bottom | 2.9 | 3.2 | 55 | <50 | <5 | <5 | 340 | 9 | 0.76 |
| 26 Feb. 1999 | 49 days | control | top | 3.7 | 4.4 | 90 | 250 | <5 | <5 | 780 | 16.7 | 1 |
| 26 Feb. 1999 | 49 days | control | middle | 2 | 2.2 | <50 | <50 | <5 | <5 | 450 | 8 | 1 |
| 26 Feb. 1999 | 49 days | control | bottom | 0.8 | 0.8 | >50 | <50 | <5 | <5 | 300 | 4.4 | 0.8 |
| 26 Feb. 1999 | 49 days | 10 L/50 m² | top | — | — | — | — | — | — | — | — | — |
| 26 Feb. 1999 | 49 days | 10 L/50 m² | middle | — | — | — | — | — | — | — | — | — |
| 26 Feb. 1999 | 49 days | 10 L/50 m² | bottom | — | — | — | — | — | — | — | — | — |
| 26 Feb. 1999 | 49 days | 30 L/50 m² | top | 5 | 6.4 | 170 | 290 | <5 | <5 | 1700 | 22.4 | 0.8 |
| 26 Feb. 1999 | 49 days | 30 L/50 m² | middle | 2.8 | 3.1 | <50 | <50 | <5 | <5 | 720 | 8.6 | 1.6 |
| 26 Feb. 1999 | 49 days | 30 L/50 m² | bottom | 2.3 | 2.5 | <50 | <50 | <5 | <5 | 600 | 8 | 1.2 |
| 4 Mar. 1999 | 55 days | control | top | 3.2 | 4.1 | 110 | 210 | <5 | <5 | 1100 | 22.2 | 1.3 |
| 4 Mar. 1999 | 55 days | control | middle | 0.9 | 1.0 | <50 | <50 | <5 | <5 | 490 | 6.3 | 1 |
| 4 Mar. 1999 | 55 days | control | bottom | 0.9 | 0.9 | <50 | <50 | <5 | <5 | 420 | 5.2 | 0.9 |
| 4 Mar. 1999 | 55 days | 10 L/50 m² | top | — | — | — | — | — | — | — | — | — |
| 4 Mar. 1999 | 55 days | 10 L/50 m² | middle | — | — | — | — | — | — | — | — | — |
| 4 Mar. 1999 | 55 days | 10 L/ 50 m² | bottom | — | — | — | — | — | — | — | — | — |
| 4 Mar. 1999 | 55 days | 30 L/50 m² | top | 15 | 18.3 | 110 | 68 | <5 | <5 | 2000 | 18 | 1.1 |
| 4 Mar. 1999 | 55 days | 30 L/50 m² | middle | 3.3 | 3.7 | <50 | <50 | <5 | <5 | 800 | 10 | 1.9 |
| 4 Mar. 1999 | 55 days | 30 L/ 50 m² | bottom | 1 | 1.1 | <50 | <50 | <5 | <5 | 600 | 8.8 | 1.5 |
| 12 Mar. 1999 | 63 days | control | top | 15 | 18.9 | 71 | 270 | — | — | 1100 | 20.8 | 0.9 |
| 12 Mar. 1999 | 63 days | control | middle | 3 | 3.2 | <50 | <50 | — | — | 400 | 5.9 | 0.8 |
| 12 Mar. 1999 | 63 days | control | bottom | 1.3 | 1.4 | <50 | <50 | — | — | 260 | 4 | 0.4 |
| 12 Mar. 1999 | 63 days | 30 L/50 m² | top | 9.2 | 12.1 | 120 | 140 | — | — | 1600 | 23.9 | 1.2 |
| 12 Mar. 1999 | 63 days | 30 L/50 m² | middle | 3.8 | 4.2 | <50 | <50 | — | — | 810 | 9.2 | 1.6 |
| 12 Mar. 1999 | 63 days | 30 L/50 m² | bottom | 5.3 | 5.8 | <50 | <50 | — | — | 720 | 8.4 | 1.2 |
| 19 Mar. 1999 | 70 days | control | top | 11 | 14.4 | 110 | 170 | — | — | 1900 | 23.7 | 1.9 |
| 19 Mar. 1999 | 70 days | control | middle | 5.7 | 6.3 | <50 | <50 | — | — | 960 | 10.2 | 1.9 |
| 19 Mar. 1999 | 70 days | control | bottom | 2 | 2.2 | <50 | <50 | — | — | 520 | 7.2 | 1 |
| 19 Mar. 1999 | 70 days | 30 L/50 m² | top | 5.4 | 6.9 | 210 | 290 | — | — | 1800 | 21.2 | 2 |
| 19 Mar. 1999 | 70 days | 30 L/50 m² | middle | 4 | 4.3 | <50 | <50 | — | — | 580 | 7.1 | 1.2 |
| 19 Mar. 1999 | 70 days | 30 L/50 m² | bottom | 3.5 | 3.8 | <50 | <50 | — | — | 620 | 8 | 1.2 |
| 26 Mar. 1999 | 77 days | control | top | 14 | 19.2 | 160 | 260 | — | — | 2800 | 27 | 1.8 |
| 26 Mar. 1999 | 77 days | control | middle | 6.9 | 7.7 | <50 | <50 | — | — | 1100 | 10.1 | 2.1 |
| 26 Mar. 1999 | 77 days | control | bottom | 2.7 | 2.9 | <50 | <50 | — | — | 410 | 6.9 | 0.8 |
| 26 Mar. 1999 | 77 days | 30 L/50 m² | top | 12 | 17.0 | 170 | 170 | — | — | 1800 | 29.5 | 1.2 |
| 26 Mar. 1999 | 77 days | 30 L/50 m² | middle | 6.8 | 7.7 | <50 | <50 | — | — | 910 | 11.9 | 1.9 |
| 26 Mar. 1999 | 77 days | 30 L/50 m² | bottom | 6.3 | 7.2 | <50 | <50 | — | — | 890 | 13 | 1.8 |

The control sample data are presented in FIG. 5 (left hand and descending series of histograms). These data show:

TN—over time the levels in the deeper section of the plugs declines (hatched bars, compare day zero data point with day 31);

CEC—values vary between 5-10 in the top layer to <5 in the deepest section of the plug. These values declined by the end of the trial;

TOC—is distributed more or less evenly at the start of the trial throughout the core samples, but decreased noticeably during the time of the trial; and P and K values were very low and at the limit of detection (<50 mg/kg soil).

The plot treated with 10 liters fertilizer composition/50 m² (centre and descending series of histograms) shows:

TN—in all sections of the core samples from the treated areas was much higher compared to the controls;

CEC—values for the test samples were consistently >10 in the top sections of the core samples, and were also higher throughout the plug as compared to the controls;

TOC—appeared to increase after treatment, and more carbon appeared to accumulate in the soil substructure; and P and K in the top layer of the core samples were noticeably higher in the test samples compared to the controls.

The plot treated with 30 liters fertilizer composition/50 m² (right and descending series of histograms) show:

TN—increased compared to the control, although values were lower than those obtained with the 30 L/50 m² fertilizer composition dosage rate;

CEC—values were higher than in the control, especially within the core samples at depth;

TOC—appeared to be higher than in the controls; and

P and K were about the same as the values found with the controls.

Accordingly, it will be appreciated that the CEC after treatment with the fertilizer composition was markedly increased. The initial CEC value was about 7 milli equivalents/100 g of soil. After treatment the CEC values rose, and in some cases values of 20 were recorded. Total N in the soil was about 800 mg/Kg soil before treatment, while after treatment 2100 mg/Kg was detected. Total organic carbon was about 2 mg/Kg in the soil before treatment, while after treatment levels of up to 3 mg/Kg were detected. Potassium and phosphorus levels in the control and test areas were approximately the same.

EXAMPLE 10

Microbial Populations in Nursery Plots

Turf plugs for the nursery plots described in Example 8 were analysed for microbial content. Total microbial counts were obtained for soil samples taken at different depths within the core samples. Total bacterial counts were obtained by serial dilution, and plating onto nutrient and selective agar. An approximate estimate of the number of bacilli, pseudomonads and moulds was also determined. These tests were carried out aerobically, so micro-aerobic and anaerobic organisms may not been detected. The results are summarized in Table 7.

TABLE 7

Total Microbial Counts in Turf Plugs for Golf Course Nursery Plots

| Date | Time | Application | Section | *Pseudomonas* (cfu/g × $10^3$) | Moulds (cfu/g × $10^3$) | *Bacillus* (cfu/g × $10^3$) | Total Plate Count (cfu/g × $10^3$) |
|---|---|---|---|---|---|---|---|
| 8 Jan. 1999 | Initial | control | top | 2500 | 0 | 0 | 5000 |
| 8 Jan. 1999 | Initial | control | middle | 115 | 0 | 0 | 175 |
| 8 Jan. 1999 | Initial | control | bottom | 60 | 0 | 0 | 190 |
| 8 Jan. 1999 | Initial | 10 L/50 m² | top | 3000 | 0 | 0 | 3000 |
| 8 Jan. 1999 | Initial | 10 L/50 m² | middle | 75 | 0 | 0 | 110 |
| 8 Jan. 1999 | Initial | 10 L/50 m² | bottom | 55 | 0 | 1 | 0 |
| 8 Jan. 1999 | Initial | 30 L/50 m² | top | 1900 | 0 | 1 | 3500 |
| 8 Jan. 1999 | Initial | 30 L/50 m² | middle | 35 | 0 | 1 | 0 |
| 8 Jan. 1999 | Initial | 30 L/50 m² | bottom | 125 | 0 | 0 | 1000 |
| 15 Jan. 1999 | 7 days | control | top | 2000 | 0 | 0 | 5500 |
| 15 Jan. 1999 | 7 days | control | middle | 140 | 0 | 0 | 0 |
| 15 Jan. 1999 | 7 days | control | bottom | 150 | 0 | 0 | 1600 |
| 15 Jan. 1999 | 7 days | 10 L/50 m² | top | 2350 | 0 | 0 | 14500 |
| 15 Jan. 1999 | 7 days | 10 L/50 m² | middle | 75 | 0 | 0 | 500 |
| 15 Jan. 1999 | 7 days | 10 L/50 m² | bottom | 85 | 0 | 0 | 6500 |
| 15 Jan. 1999 | 7 days | 30 L/50 m² | top | 1250 | 0 | 0 | 8000 |
| 15 Jan. 1999 | 7 days | 30 L/50 m² | middle | 105 | 0 | 0 | 350 |
| 15 Jan. 1999 | 7 days | 30 L/50 m² | bottom | 90 | 0 | 0 | 175 |
| 22 Jan. 1999 | 14 days | control | top | 230 | 0 | 0 | 400 |
| 22 Jan. 1999 | 14 days | control | middle | 75 | 0 | 0 | 50 |
| 22 Jan. 1999 | 14 days | control | bottom | 50 | 0 | 0 | 120 |
| 22 Jan. 1999 | 14 days | 10 L/50 m² | top | 80 | 0 | 1 | 500 |
| 22 Jan. 1999 | 14 days | 10 L/50 m² | middle | 20 | 0 | 0 | 100 |
| 22 Jan. 1999 | 14 days | 10 L/50 m² | bottom | 90 | 0 | 0 | 250 |
| 22 Jan. 1999 | 14 days | 30 L/50 m² | top | 105 | 0 | 0 | 1750 |
| 22 Jan. 1999 | 14 days | 30 L/50 m² | middle | 45 | 0 | 0 | 175 |
| 22 Jan. 1999 | 14 days | 30 L/50 m² | bottom | 0 | 0 | 0 | 150 |
| 29 Jan. 1999 | 21 days | control | top | 225 | 0 | 0 | 1750 |
| 29 Jan. 1999 | 21 days | control | middle | 0 | 0 | 0 | 70 |
| 29 Jan. 1999 | 21 days | control | bottom | 0 | 0 | 0 | 0 |
| 29 Jan. 1999 | 21 days | 10 L/50 m² | top | 0 | 5 | 0 | 1500 |
| 29 Jan. 1999 | 21 days | 10 L/50 m² | middle | 10 | 0 | 0 | 850 |
| 29 Jan. 1999 | 21 days | 10 L/50 m² | bottom | 10 | 0 | 0 | 100 |
| 29 Jan. 1999 | 21 days | 30 L/50 m² | top | 100 | 0 | 0 | 5500 |
| 29 Jan. 1999 | 21 days | 30 L/50 m² | middle | 15 | 0 | 1 | 0 |
| 29 Jan. 1999 | 21 days | 30 L/50 m² | bottom | 0 | 0 | 0 | 150 |
| 5 Feb. 1999 | 28 days | control | top | 55 | 0 | 0 | 4000 |
| 5 Feb. 1999 | 28 days | control | middle | 0 | 0 | 0 | 200 |
| 5 Feb. 1999 | 28 days | control | bottom | 0 | 0 | 0 | 300 |
| 5 Feb. 1999 | 28 days | 10 L/50 m² | top | 85 | 0 | 1 | 150 |
| 5 Feb. 1999 | 28 days | 10 L/50 m² | middle | 0 | 0 | 0 | 200 |
| 5 Feb. 1999 | 28 days | 10 L/50 m² | bottom | 0 | 0 | 0 | 100 |
| 5 Feb. 1999 | 28 days | 30 L/50 m² | top | 35 | 0 | 1 | 5000 |
| 5 Feb. 1999 | 28 days | 30 L/50 m² | middle | 5 | 0 | 0 | 100 |
| 5 Feb. 1999 | 28 days | 30 L/50 m² | bottom | 10 | 0 | 0 | 0 |
| 8 Feb. 1999 | 31 days | control | top | 10 | 10 | 1 | 1000 |
| 8 Feb. 1999 | 31 days | control | middle | 10 | 0 | 0 | 750 |
| 8 Feb. 1999 | 31 days | control | bottom | 0 | 0 | 0 | 150 |
| 8 Feb. 1999 | 31 days | 10 L/50 m² | top | 0 | 5 | 4 | 2750 |
| 8 Feb. 1999 | 31 days | 10 L/50 m² | middle | 0 | 5 | 5 | 150 |
| 8 Feb. 1999 | 31 days | 10 L/50 m² | bottom | 0 | 0 | 0 | 800 |

TABLE 7-continued

Total Microbial Counts in Turf Plugs for Golf Course Nursery Plots

| Date | Time | Application | Section | *Pseudomonas* (cfu/g × $10^3$) | Moulds (cfu/g × $10^3$) | *Bacillus* (cfu/g × $10^3$) | Total Plate Count (cfu/g × $10^3$) |
|---|---|---|---|---|---|---|---|
| 8 Feb. 1999 | 31 days | 30 L/50 m² | top | 50 | 10 | 3 | 1500 |
| 8 Feb. 1999 | 31 days | 30 L/50 m² | middle | 5 | 55 | 0 | 200 |
| 8 Feb. 1999 | 31 days | 30 L/50 m² | bottom | 15 | 0 | 0 | 175 |
| 10 Feb. 1999 | 33 days | control | top | 25 | 0 | 6 | 1200 |
| 10 Feb. 1999 | 33 days | control | middle | 25 | 0 | 5 | 100 |
| 10 Feb. 1999 | 33 days | control | bottom | 90 | 0 | 2 | 900 |
| 10 Feb. 1999 | 33 days | 10 L/50 m² | top | 160 | 0 | 1 | 125 |
| 10 Feb. 1999 | 33 days | 10 L/50 m² | middle | 70 | 0 | 1 | 240 |
| 10 Feb. 1999 | 33 days | 10 L/50 m² | bottom | 70 | 0 | 0 | 160 |
| 10 Feb. 1999 | 33 days | 30 L/50 m² | top | 90 | 0 | 3 | 3500 |
| 10 Feb. 1999 | 33 days | 30 L/50 m² | middle | 10 | 0 | 3 | 100 |
| 10 Feb. 1999 | 33 days | 30 L/50 m² | bottom | 45 | 0 | 2 | 400 |
| 26 Feb. 1999 | 49 days | control | top | 65000 | 0 | 7 | 74000 |
| 26 Feb. 1999 | 49 days | control | middle | 900 | 0 | 0 | 740 |
| 26 Feb. 1999 | 49 days | control | bottom | 650 | 0 | 0 | 780 |
| 26 Feb. 1999 | 49 days | 30 L/50 m² | top | 10000 | 0 | 2 | 13000 |
| 26 Feb. 1999 | 49 days | 30 L/50 m² | middle | 340 | 0 | 0 | 500 |
| 26 Feb. 1999 | 49 days | 30 L/50 m² | bottom | 200 | 0 | 0 | 450 |
| 4 Mar. 1999 | 55 days | control | top | 1000 | 0 | 4 | 8000 |
| 4 Mar. 1999 | 55 days | control | middle | 120 | 0 | 0 | 160 |
| 4 Mar. 1999 | 55 days | control | bottom | 130 | 0 | 0 | 560 |
| 4 Mar. 1999 | 55 days | 30 L/50 m² | top | 5000 | 0 | 5 | 9000 |
| 4 Mar. 1999 | 55 days | 30 L/50 m² | middle | 210 | 0 | 0 | 290 |
| 4 Mar. 1999 | 55 days | 30 L/50 m² | bottom | 250 | 0 | 0 | 260 |
| 12 Mar. 1999 | 63 days | control | top | 6000 | 0 | 5 | 10000 |
| 12 Mar. 1999 | 63 days | control | middle | 130 | 0 | 0 | 250 |
| 12 Mar. 1999 | 63 days | control | bottom | 0 | 0 | 0 | 450 |
| 12 Mar. 1999 | 63 days | 30 L/50 m² | top | 10000 | 0 | 5 | 16000 |
| 12 Mar. 1999 | 63 days | 30 L/50 m² | middle | 0 | 0 | 1 | 60 |
| 12 Mar. 1999 | 63 days | 30 L/50 m² | bottom | 0 | 0 | 0 | 120 |
| 19 Mar. 1999 | 70 days | control | top | 3000 | 0 | 1 | 3000 |
| 19 Mar. 1999 | 70 days | control | middle | 0 | 0 | 0 | 180 |
| 19 Mar. 1999 | 70 days | control | bottom | 50 | 0 | 0 | 440 |
| 19 Mar. 1999 | 70 days | 30 L/50 m² | top | 5000 | 0 | 2 | 18000 |
| 19 Mar. 1999 | 70 days | 30 L/50 m² | middle | 3000 | 0 | 0 | 600 |
| 19 Mar. 1999 | 70 days | 30 L/50 m² | bottom | 15000 | 0 | 0 | 8000 |
| 26 Mar. 1999 | 77 days | control | top | 22000 | 0 | 0 | 70000 |
| 26 Mar. 1999 | 77 days | control | middle | 1000 | 0 | 2 | 510 |
| 26 Mar. 1999 | 77 days | control | bottom | 30000 | 0 | 9 | 18000 |
| 26 Mar. 1999 | 77 days | 30 L/50 m² | top | 5000 | 0 | 2 | 23000 |
| 26 Mar. 1999 | 77 days | 30 L/50 m² | middle | 1000 | 0 | 0 | 1000 |
| 26 Mar. 1999 | 77 days | 30 L/50 m² | bottom | 15000 | 0 | 0 | 5000 |

Cfu/g: colony forming units per gram sample

Bacterial counts were variable, but there was a trend to higher total numbers of bacteria in the samples for plots treated with fertilizer composition compared to the untreated plot. Bacilli were present in some soil samples, but at quite low numbers, while Pseudomonads were found in most samples at similar levels in treated and control samples. Treatment did not appear to encourage the growth of moulds as virtually no moulds, were detected in any of the soil samples.

EXAMPLE 11

Turf Trials on Turf Farms

The effect of the fertilizer compositions from Examples 1 and 5 on the growth of freshly sown bent grass was investigated and compared to controls. Trials were conducted in duplicate on freshly sown bent grass varieties on 100 m² surface area trial plots at a turf farm located 100 k NE of Melbourne on a river flats area of good fertility. The effect of various application rates of the fertilizer compositions on grass appearance and soil chemistry was compared to control areas that received no treatment other than watering. The trial areas were also compared with the appearance of the overall field, which received the usual fertiliser regime during the course of the trials. The dosage rates were varied from 10-60 liters/100 m² turf for 10 weeks. The appearance of the test plots was analysed at regular intervals, and scored from 1 to 5 as described in Example 8. These data are shown in Table 8.

TABLE 8

Effect of the Fertilizer Composition on Turf Farm Test Plots
Turf Farm Test Plots

| Days | Control | 5 L/ 50 m² | 10 L/ 50 m² | 20 L/ 50 m² | 30 L/ 50 m² | 60 L/ 100 m² |
|---|---|---|---|---|---|---|
| 0 | 0 | 0 | 0 | 0 | 0 | 1 |
| 28 | 0 | 1 | 2 | 2 | 3 | — |
| 35 | 0 | 2 | 3 | 3 | 4 | — |
| 42 | 1 | 2 | 3 | 4 | 5 | — |
| 63 | 2 | 3 | 4 | 5 | 5 | 5 |

There was a noticeable improvement in the appearance of the turf for all the test plots as compared with the controls, and also compared with the rest of the fields. The difference became more marked as the trial continued. The rating of highest dosage rate plot appeared outstanding compared to the control and to the rest of the plot at the 8-week period.

There was some suggestion that *Rhizoctonia* was present in this field, and after 6 weeks the entire field was treated with a fungicide. The sharp demarcation between the 60 L/100 m² treatment zone and the control suggests that the fertilizer composition may have some anti-fungal activity. Anecdotal evidence at the turf farm strongly suggests that this is the case.

Soil samples were taken during the trials and analysed for CEC, K, P, N, and carbon. The trials were conducted in duplicate, and it was apparent from the analysis that the duplicate trials that were positioned in "strips" and in sequence covered two soil types. One (FIG. 6) was sandy, while the other contained a large amount of loam (FIG. 7). In the sandy soil, the CEC levels were <5, throughout the core samples, and N, K, P levels were in the range targeted by the farm. The addition of the fertilizer composition had some effect on these parameters, but the effect was marginal, and nutritionally, ie in terms of N, K, P, it seems unlikely that these changes would have greatly affected turf root nutrition. The second trial showed similar trends with slight changes in the gross nutritional/soil chemistry indices measured. However, these data did not indicate that the significant visual improvement in the grass would be attributed to these changes. These results suggest that the improved grass yield was probably achieved by a control of pathogens, or increased nutrient delivery to the foliage, or both.

A further trial was undertaken while these tests were under way. A section of a field that showed fairly poor appearance was selected, and the fertilizer composition was applied to the maturing turf using the previously established weekly dosing method. There was a noticeable improvement in visual appearance. The causal nature of the change in appearance can unambiguously be ascribed to the application of the fertilizer composition. The cause of the effect seems unlikely to be due solely to nutritional effects. Thus, it seems that the fertilizer composition may act by enhancing the "soil suppressiveness" of the soil.

During the trials, digital photos of representative m² of turf were captured and processed by colour analysis. The % of green pixels in the pictures was used to estimate grass coverage. Greater green pixal content was assumed to be directly related to grass coverage. The comparison was based on 'hue', which represents the combination of wavelengths required to produce a colour. A 'hue' value of 120 was obtained for pure green. Lower 'hue' values were obtained when less green colour was present in the digitised image. The data for the high dose of fertilizer composition treated turf was analysed using this technique and compared with control turf.

Figure 8:
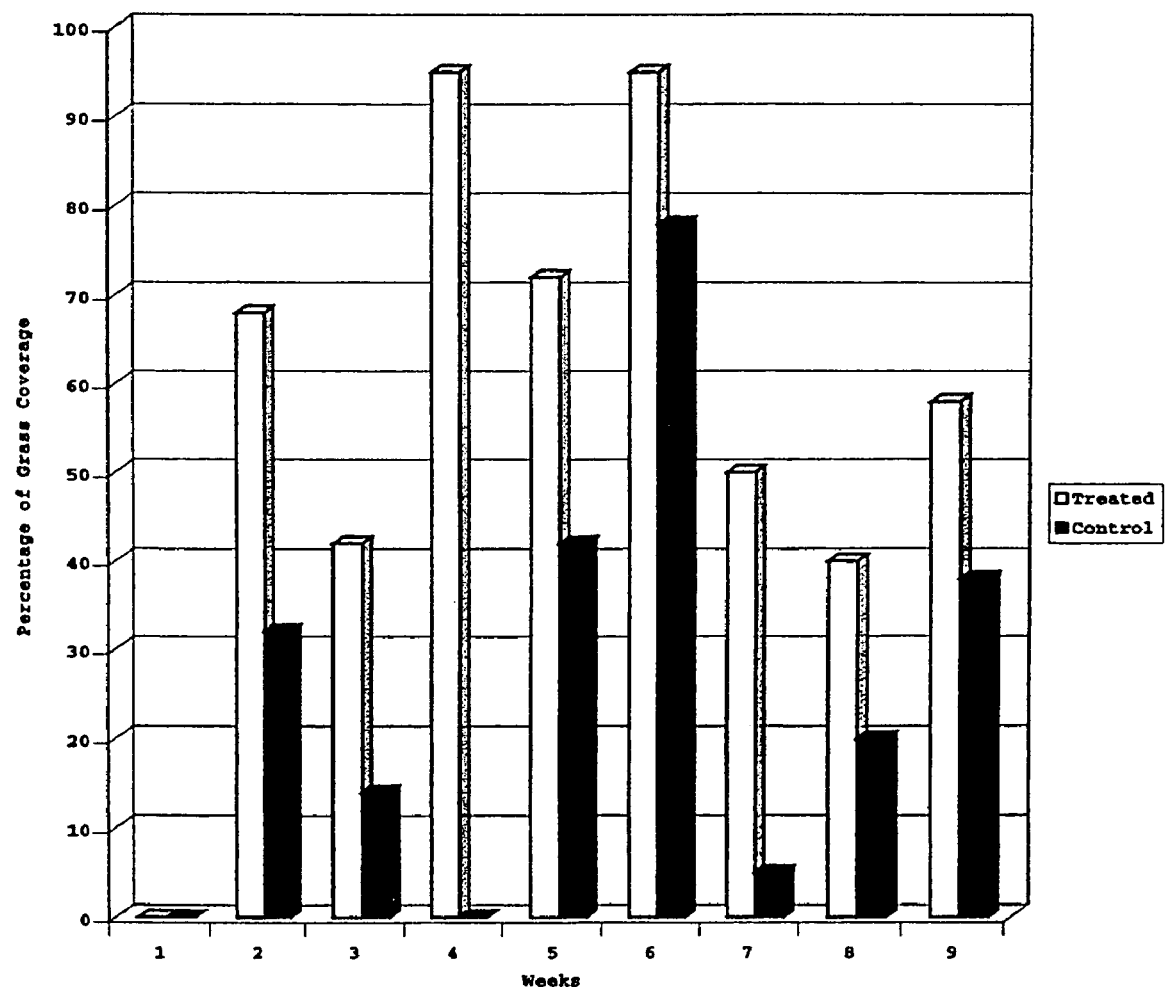
FIG. 8 shows the effect of the fertilizer composition on lateral grass propagation, measured as green hue in digital photographs of 1 metre$^2$ grass plots.

The data showed that the green hue was always greater for the fertilizer composition treated areas compared to the control turf for the 9 week trial period. The colour climbed rapidly after treatment began, and over the first 5 weeks. During the $4^{th}$ and $6^{th}$ week the values almost reached 100 which was close to the theoretical 'pure' value of 120. In contrast, the control had a promising start, but fell back in the $2^{nd}$ week and was zero at the $4^{th}$ week. Even allowing for the indicative nature of the analysis, it appeared that the control may have suffered from a pathogen attack. The control did improve after the $4^{th}$ week, but never to obtained the same level as the treated grass. It was also noted that the grass was cut during weeks 3, 7 and 8 which reduced the grass coverage and probably contributed to the reduction in 'hue' index observed for all turf samples at these times. A graph of these data is shown in FIG. 8, and it is clear that the treatment with the fertilizer composition provides a head start to the grass after germination.

Figure 9:
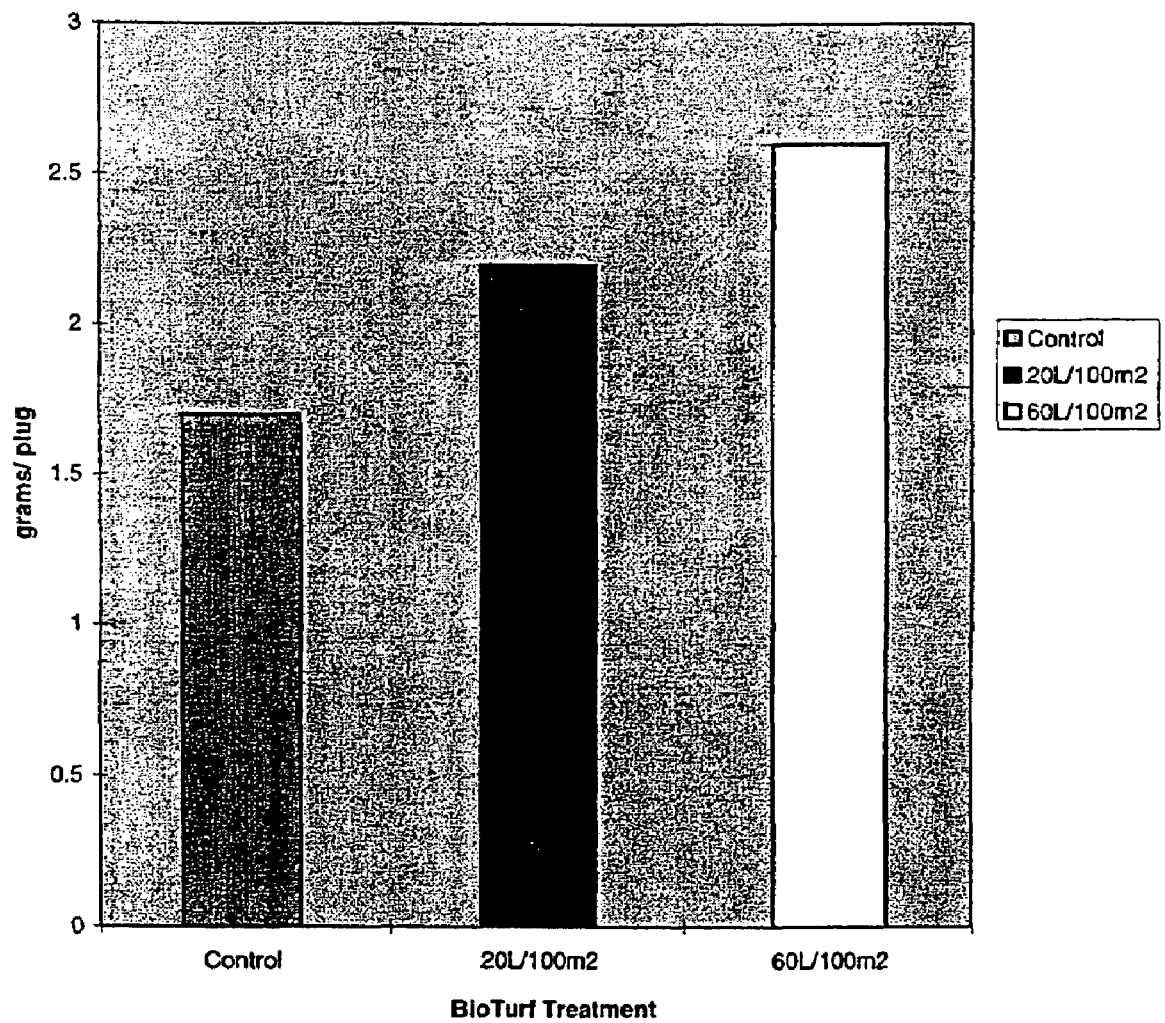
FIG. 9 shows the effect of the fertilizer composition on the root development of grass from a turf farm. This was determined by measuring root mass per unit plug of turf.

The effect of fertilizer composition treatment on root development was also determined by measuring root mass per unit plug of turf. The data is plotted in FIG. 9. Turf plugs were recovered after the $8^{th}$ week of the trial from control and treated grass plots. The highest treatments stimulated root development by around 60%. The lowest dosage rate of 20 liters per 100 m² produced almost 40% stimulation.

Similarly, treatment had a significant effect on the rate of growth of the foliage. The increase was dependent on dose rate. Rates measured from the mass of foliage recovered above the air/soil interface indicated that the rate with the treatment was up to 40% greater than for the control areas, and appeared to be due to growth in both horizontal and vertical directions.

Soil samples were horizontally sectioned into top, middle and bottom (25 cm deep plugs). The samples were resuspended in sterile water and plated onto nutrient agar, and total colonies were determined after growth and colony formation under aerobic conditions. There was no great difference in the total colonies detected in soil plugs before and after application of the fertilzer composition. However, there were changes in the distribution of organisms present.

As introduced previously, depending upon the type of microroganisms present in soil, there may be a suppressive effect on certain pathogens. There are two types of suppression found in soil, general and specific. In soils that are generally suppressive the total activity of the soil microbiota is largely responsible for limiting the growth of the pathogens. This activity can take the form of competition as well as antagonistic effects. When one or a few microorganisms control the pathogen suppression, then this is termed specific suppression. The microorganisms that may potentiate specific suppression include species of *Bacillus, Streptomyces* and *Pseudomonas*, especially fluorescent pseudomonads, amoebae and fungi that are closely related to the pathogen itself, and also members of the Actinomycetes which are used industrially for the production of antibiotics.

Accordingly, the levels of fluorescent pseudomonads, the actinomycetes, endospore forming bacteria and fungi were assayed in soil plugs taken from the treated soils. Most fungi are beneficial and have a role as saprhophytic organisms that participate in the breakdown of organic matter in the soil. An increase in the population of fungi can therefore be considered as beneficial.

Figure 10:
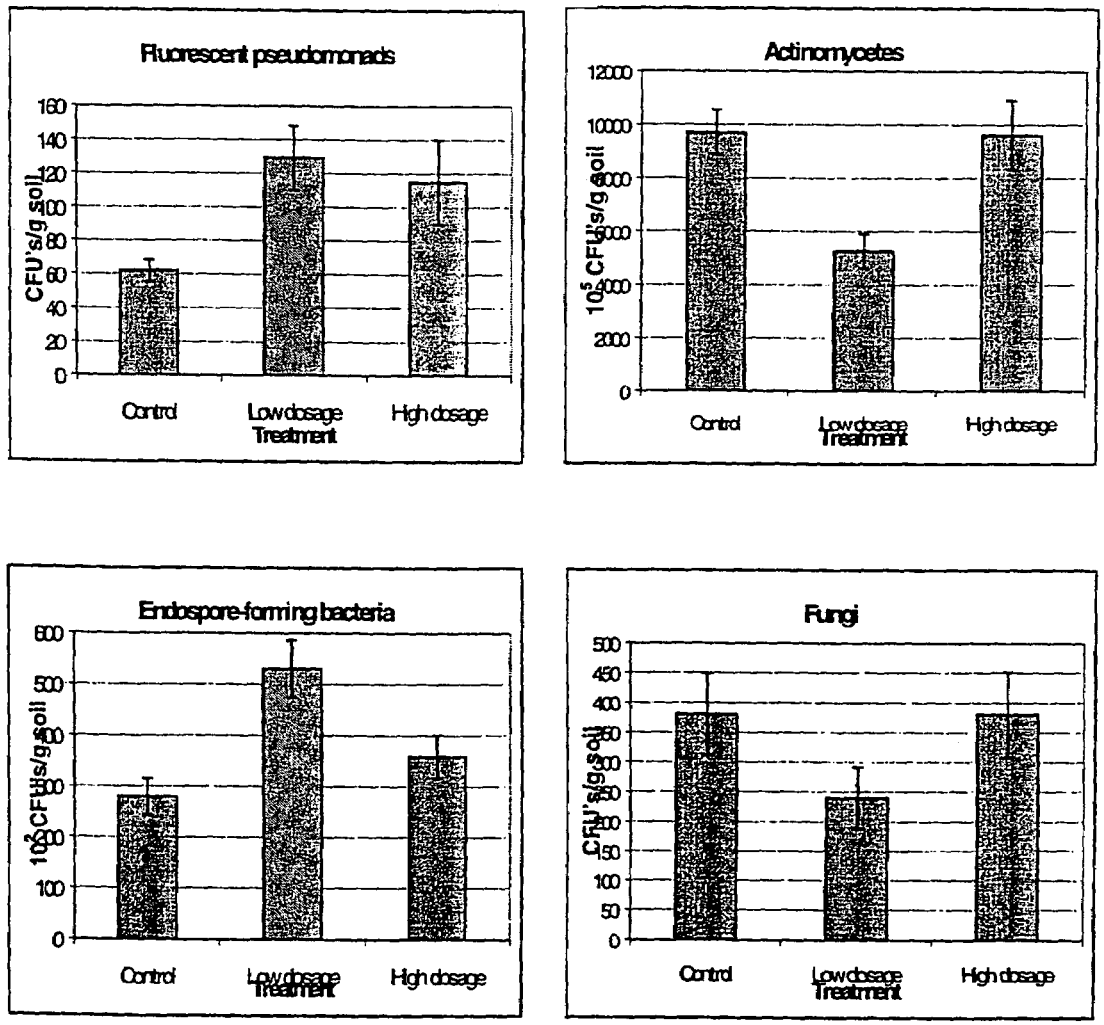
FIG. 10 shows the effect of the fertilizer composition on the levels of 4 groups of microorganisms—fluorescent pseudomonads, actinomycetes, endospore forming bacteria, and saphrophytic fungi.

Multiple soil samples (n>20) were removed from the 10 and 60 liters/100 m² treated dosage plots and assayed for these microorganisms by plating and counting colonies on selective solid medium. These results are shown in FIG. 10.

The level of fluorescent pseudomonads in the soil was low, but in the normal range. However, in both high and low treatment areas, there was an increase in the overall number of bacteria. These assays were carried out 6 weeks after the trials had commenced. There was also a significant increase in the number of endospore forming bacteria present after treatment with the fertilizer composition. Most of these organisms were bacilli. The low dosage of the fertilizer composition produced a bigger change than the higher treatment rate. On the other hand, the low dosage rate reduced the number of Actinomycetes and Fungi by almost half. This could also have been due to a selective inhibition effect on some members of the microflora. At this stage, we have not ascertained whether there are any synergistic effects present. At the higher rate of application the numbers moved back to those assayed in non-treated turf plugs.

Taken together these data show that addition of the fertilizer composition stimulates the number of fluorescent pseudomonads and endospore forming bacteria, while tending not to favour the multiplication of fungi and actinomycetes. Suppressive soil character could therefore be due to any one of the groups or several or all in combination. The fact that there is a stimulation of two of the microbial types which are known to contribute to soil suppressive character in other systems supports the proposal that the fertilizer composition may allow suppressive character to develop quite quickly in the soil. It has already been mentioned that root development is enhanced with the fertilizer composition, and that this is consistent with increased tolerance or diminished activity of soil pathogens.

Pathogen attack may be observed in turf as discrete discoloured patches in the soil. Horse-shoe brown patches for instance are generally typical of *Fusarium* infestation. During the trials the paddock was regularly inspected for the appearance of disease. No disease was observed by visual inspection for discreet patches in the treated plots over the course of the trials. However, in the remainder of the paddock there were small hand sized discoloured patches detected.

EXAMPLE 12

Effect of the Fertilizer Composition on Subsoil Microflora

General antagonism or monoculture decline occurs when continuous cropping with a susceptible crop results in disease resistance. However, in monoculture decline, the pathogen may ultimately create a favourable environment for multiplication of its enemies. This may occur as a result of an adequate food base for progressive development of microorganisms antagonistic to the pathogen. In monoculture it usually takes 4-5 years to achieve some stabilisation of yield decline, and it may take even longer.

Suppressiveness in soils has been attributed to "antagonistic" effects of existing microflora, faster propagation of bacteria in suppressive than in conducive soils and reduced germination of inocula in the former and latter kinds of soil, hyphallysis, ethylene production, fungistasis, microbial competition ie. direct competition for food and specific types of metabolites damaging to various fungal pathogens.

In the case of turf, foliage is harvested—cut and removed—on a very regular basis. Even the severage of the leaf tips, provides entry to fungi such as *Rhizoctonia* and *Fusarium* spp which then regularly colonise and debilitate the plants. As mowing height is reduced, the plant partially compensates for its reduced carbohydrate producing foliage area by producing more filters. The result is an increase in leaf density, greater humidity, more intimate contact between plants, all of which allow the fungi to access food easily and to spread rapidly. So, intense mowing regimes provide pathways for fungal invasion, as well as the removal of fungal debris and plant debris from the monoculture. Thus, the establishment of a resistant and competitive microflora will take longer to achieve, according to the possible mechanism for the development of soil suppression provided above. The geographical separation of the disease in the foliage at the soil: air interface as compared to the microflora in the soil, also suggests that the fungi may be protected from the expected competition that would be experienced in a truly mixed microfloral situation.

The effect of the fertilizer composition plus bacteria on subsoil microflora was measured. Soil plugs were removed from the turf and the distribution of the following organisms was determined:
 i. fluorescent pseudomonads;
 ii. actinomycetes;
 iii. endospore forming bacteria; and
 iv. fungi.

Figure 11:
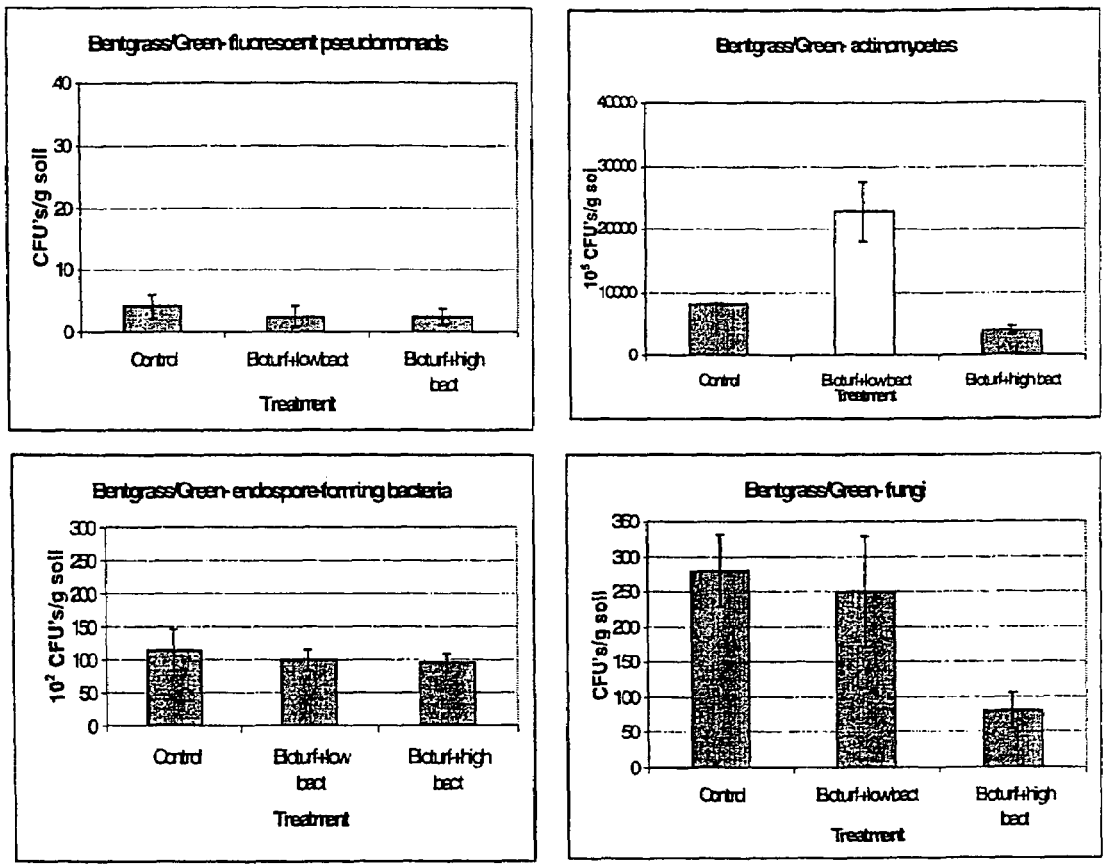
FIG. 11 shows the soil microbial numbers in soil samples removed from the Huntingdale Practice Chipping Green after treatment with fertilizer composition plus bacteria. The composition was applied (60 L/100 m$^2$) to two sections of the practice green with either Lo-dose bacterial addition or Hi-dose bacterial addition. Levels of microbes in 4 categories were subsequently analysed 14 weeks after the start of the trial.

The results from an analysis of the trial on Bent grass at Huntingdale are summarised in FIG. 11.

The number of fluorescent pseudomonads remained almost unchanged after treatment. The level of actinomycetes in the low dosage plot was more than double that of the control. Yet the high dosage area showed a decline to around half that of the control. The endospore forming bacteria remained much the same before and after the treatment with the fertilizer composition plus bacteria. However, the total fungi were reduced in a dose dependent manner by the treatment. Pseudomonads were present in fertilizer composition plus bacteria, and these data indicate that these organisms were not able to survive within the soil microflora. Similarly, Bacilli were present in the fertilizer composition plus bacteria, but did not appear to have propagated in the soil. The Actinomycetes did appear to have been influenced by treatment. Significantly there were none of these organisms in the fertilizer composition plus bacteria. There were also no fungi in the composition. The treated areas showed significantly reduced numbers of fungi present.

As there was significant evidence of fungi in the control areas (brown patches identified as *Rhizoctonia solani*) and almost none in the high-dose areas it was postulated that the reduction of total fungi numbers in the soil could have been due to the selective attack on pathogenic fungi.

A trial was carried out to determine the effect of fertilizer composition on the fifth fairway wintergreen couch at Huntingdale. This fairway showed lacklustre performance during the winter months, and appeared to be diseased. Separate areas were dosed with the fertilizer composition and fertilizer composition plus bacteria at high dosage rates.

Treatment with either formulation produced a very noticeable improvement in the appearance of the grass. Plugs from the treated soil were collected and stored at −20° C. for future reference.

Figure 12:
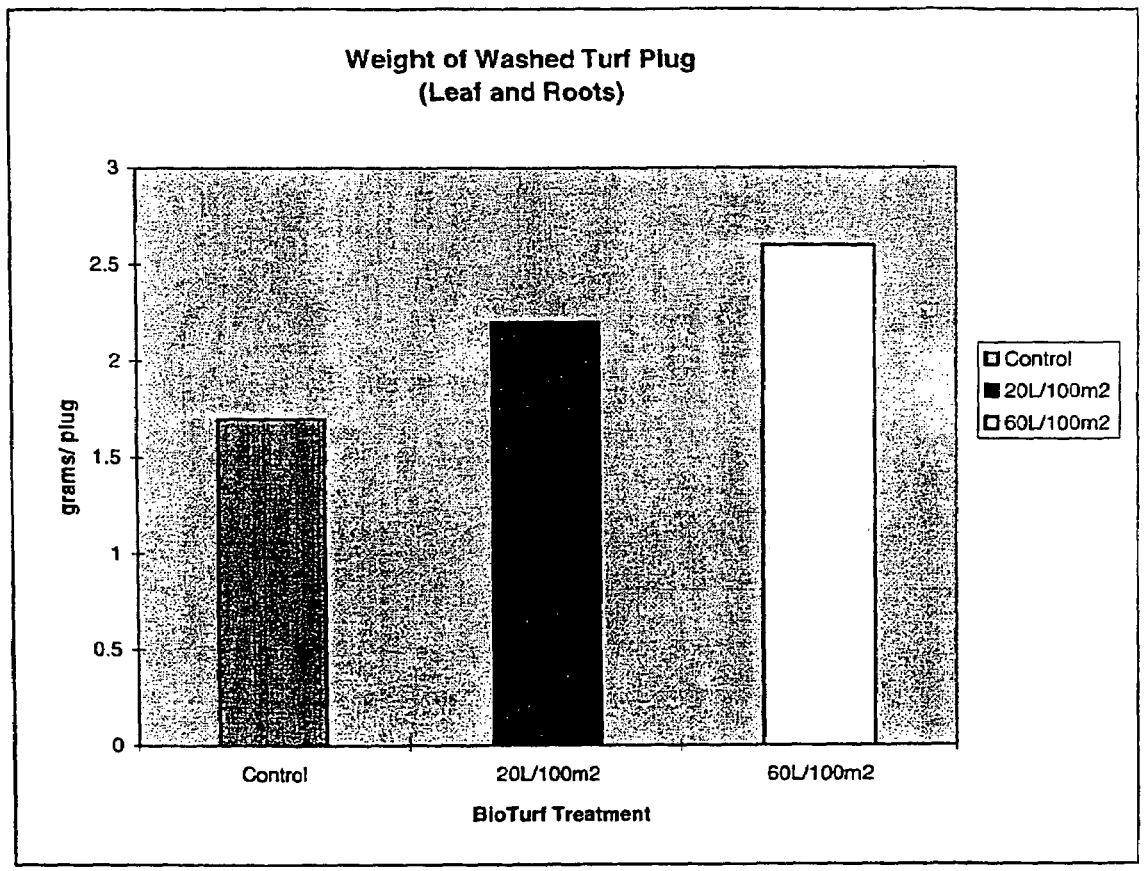
FIG. 12 shows the effect of the fertilizer composition on the root development of grass from a golf course. This was determined by measuring root mass per-unit plug of turf.

These results show that dosing with the fertilizer composition (60 L/m$^2$ dosing once a week for 6 weeks) dose improve the thickness, hue and appearance of the turf. These data are shown in FIG. 12, and support the findings from similar trials described in Example 11.

Figure 13:
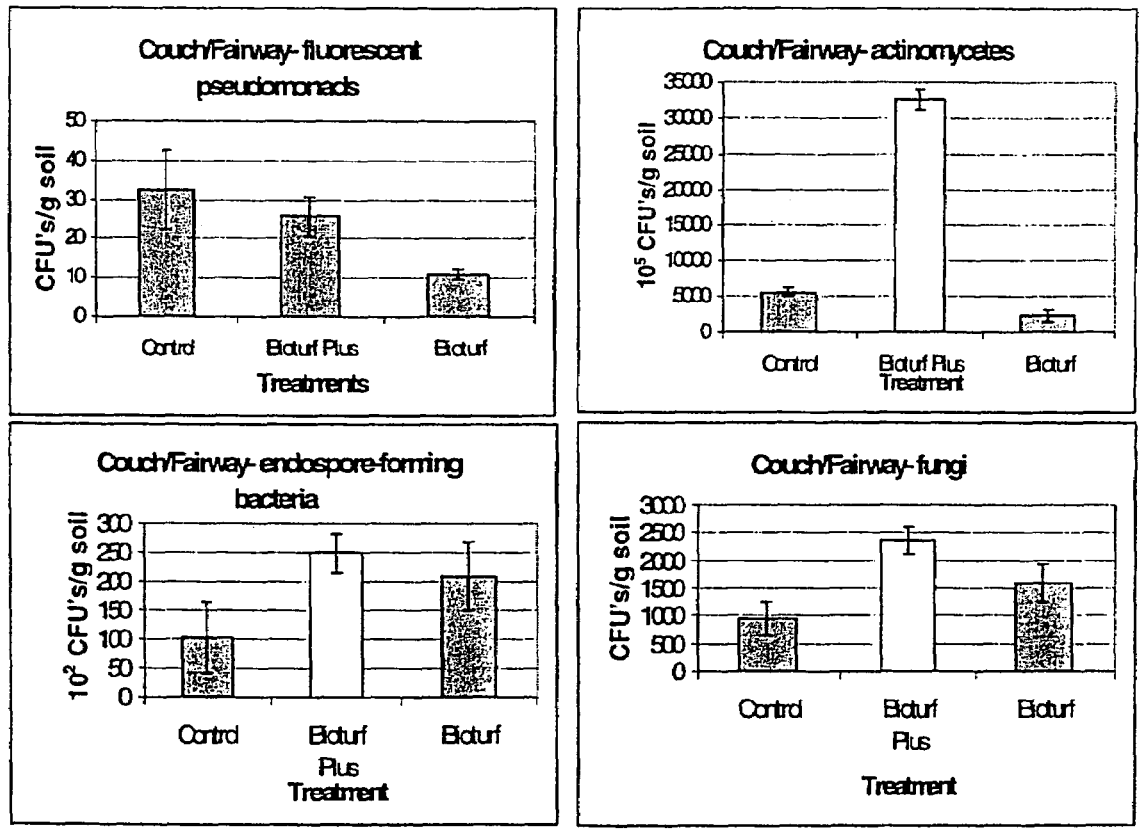
FIG. 13 shows the soil microbial populations in plugs removed from fertilizer composition (Bioturf) and fertilizer composition plus bacteria (Bioturf Plus) treated areas taken from the 5th fairway at Huntingdale. The compositions were applied at the high dose rates.

The number of fluorescent pseudomonads was also determined, and the results are summarised in FIG. 13. It was found that treatment with the fertilizer composition reduced the number of fluorescent pseudomonads compared to the control. However, the reduction was less with the fertilizer composition plus bacteria, possibly because fluorescent pseudomonads were part of the mixture, whereas they were not included in the fertilizer composition. The Actinomycetes were greater in number after treatment with the fertilizer composition plus bacteria than in the control. The fertilizer composition had a similar but less pronounced effect. Both formulations raise the numbers of endospore forming bacteria. Similarly fungi numbers were increased by the two treatments quite significantly.

Overall there was an increase in the population of 3 of the 4 microorganism groups that are believed to contribute to suppressive soil character. The fertilizer composition plus bacteria effect was slightly greater than for the fertilizer composition alone, but both produced positive effects. These results were even more impressive considering that the 5$^{th}$ fairway turf had a thatch layer, several centimetres thick, which the treatment had to penetrate. At the beginning of summer, the end of the treatment program, it was apparent that the treatment area was not suffering from 'Dry Spot' to anywhere near the degree as the untreated fairway. Groundstaff believed that Dry Spot was not caused by a disease, but was due to dormant turf, and the hydrophobic nature of the thick thatch layer. Nevertheless it was not possible to isolate fungal pathogens from the treated area, whereas the marginal areas bordering the treated areas, the rough and the control areas of the fairway contained several viable fungal pathogens.

Further experiments have been carried out using a model agar plate system in the laboratory. Pathogens were isolated from Huntingdale soil samples including *Microdochium bolleyi* (R. Sprague, De Hoog & Hermainides—Nijhof). *Microdochium* is a *Fusarium* like genus that includes several turf pathogens. Pink snow mould and *fusarium* patch are diseases now considered to be caused by *M. nivale*. *M. bolleyi* produces symptoms similar to anthracnose and is apparently a much underrated turf pathogen due to difficulties in identifying it.

Figure 14:
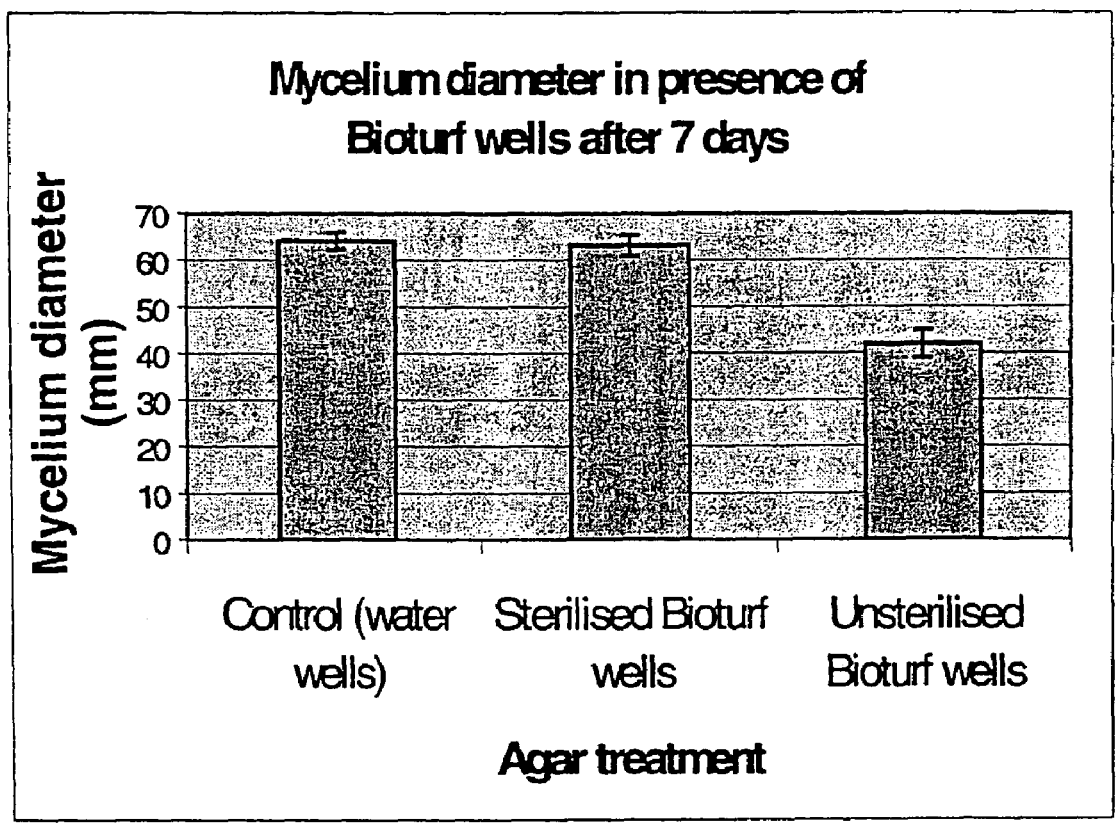
FIG. 14 shows a well experiment: *M. bolleyi* mycelium diameter after 7 days on PDA plates containing wells of sterile distilled water, post-sterilised fertilizer composition and pre-sterilised fertilizer composition.

Potato, dextrose agar (PDA) plates were inoculated with fungus that consequently spread over the surface of the plate. Holes were cut into the perimeter of the agar, and were filled with pre or post-sterilised fertilizer compositions and control solutions. It was found that a reduction in mycelium diameter was clearly demonstrated in treatments involving pre-sterilised fertilizer composition, where a definite zone of inhibition was evident (FIG. 14). Pre-sterilised fertilizer composition produced a statistically significant reduction in mycelium diameter of *M. bolleyi*, but post-sterilised fertilizer composition produced only a slight effect. This effect was not so evident from the diameter of the mycelium, but rather from the generation of a dark pigmentation annulus in the outer perimeter of the mould. This effect was attributed to stress.

Taken together growth inhibition of *M. bolleyi* appears to be related to the biological constituents of the fertilizer composition, rather than the chemical constituents. However, a synergistic effect was not ruled out, and further work is being undertaken.

Figure 15:
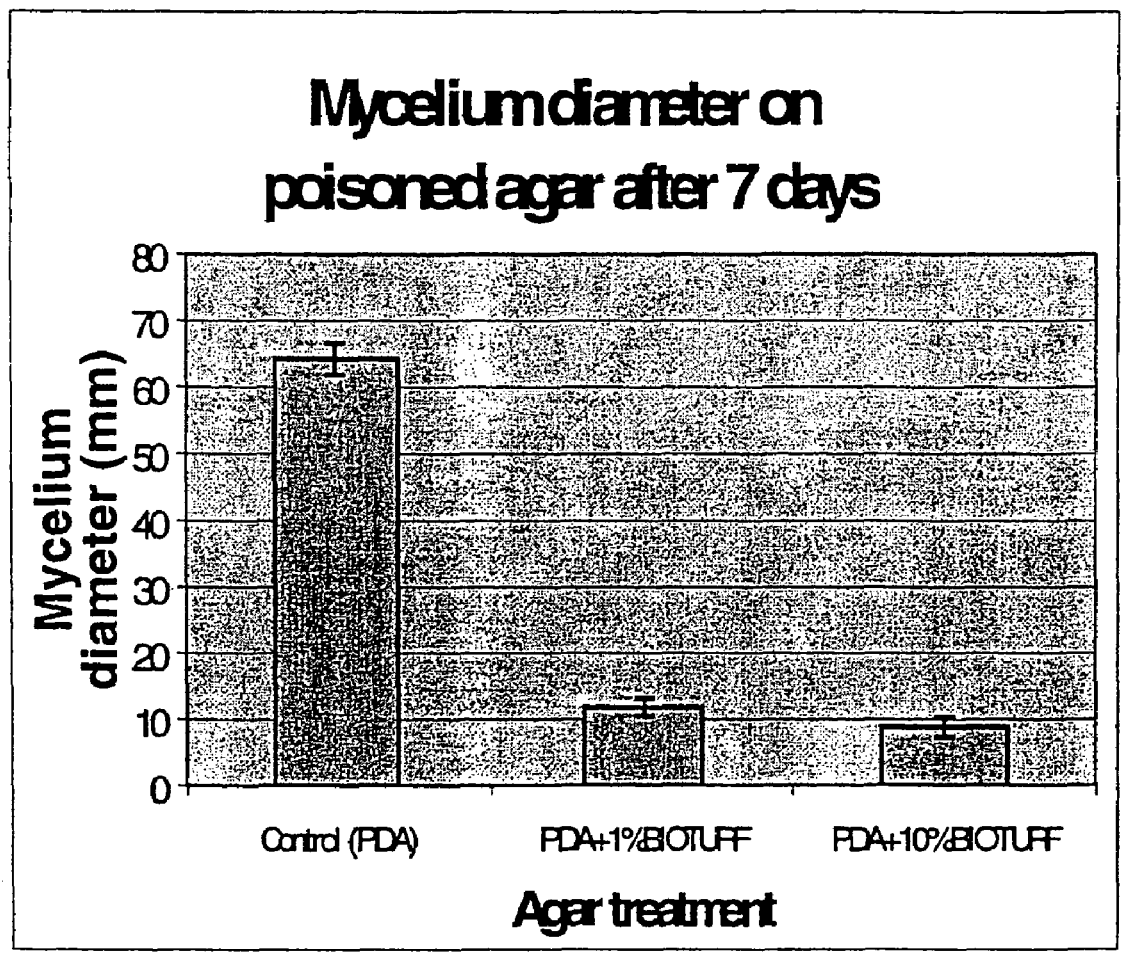
FIG. 15 shows *M. bolleyi* mycelium diameter after 7 days on PDA poisoned with 0, 1 and 10% fertilizer composition of the present invention.

Fertilizer composition was also incorporated into the PDA medium and *M. bolleyi* was inoculated onto the agar, and the effect on the growth of the mould was observed. The inhibitory effect of the fertilizer composition was shown to be dose dependent, and as shown in FIG. 15, the greater the concentration of the fertilizer composition, the greater is the inhibition. All treatments resulted in a significant reduction in the mycelium diameter compared with the growth on pure PDA.

Similar studies were carried out with *Rhizoctonia solani*. Both post-sterilised fertilizer composition and water had little effect on the spread of the fungus on PDA plates; however, the pre-sterilised fertilizer composition inhibited the mould. Moreover, there was a marked line of inhibition close to the holes in PDA, and a raising of the mycelium that appeared to indicate that the mould was attempting to avoid the fertilizer composition. There was also a marked pigmentation in these marginal areas.

However measurement of the diameter of the mycelium showed that both pre- and post-sterilised fertilizer composition had only a slight effect on the growth of *Rhizoctonia*. Hence the chemical components in fertilizer composition may supply nutrients required for growth, while the biological activity provides the inhibitory effect.

Stimulation of the *R. solani* culture isolated from the golf course may in fact be desirable. Some groups of this fungus are non-pathogenic, and actually play a role in biocontrol of disease caused by other groups of *R. solani*. Further work will be required to determine if this isolate is non-pathogenic.

Figure 16:
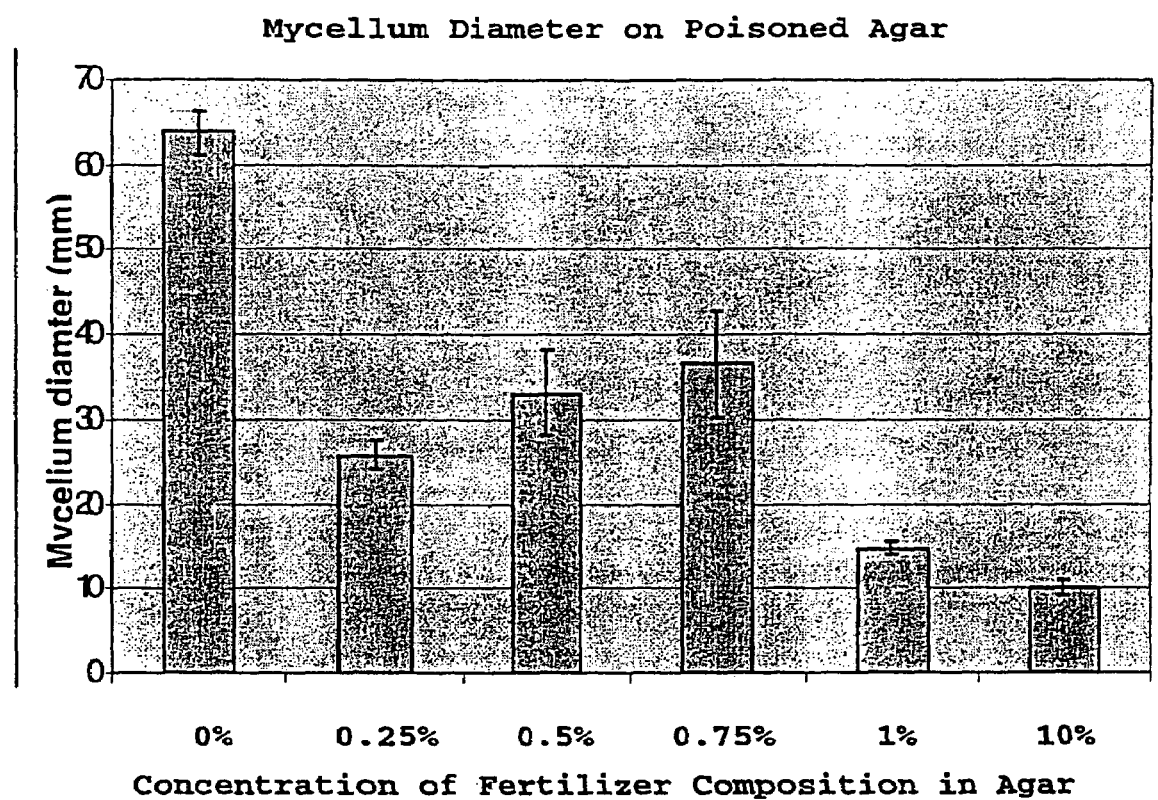
FIG. 16 shows *M. bolleyi* mycelium diameter after 7 days on PDA poisoned with concentrations ranging from 0 to 10% of the fertilizer composition of the present invention.

The growth of the fungus on PDA plates with added fertilizer composition at different concentrations was also determined. All treatments resulted in a significant reduction in mycelium diameter compared with growth on pure PDA. These are shown in FIG. 16. The largest reduction in growth was achieved on agar poisoned with 1% fertilizer composition, but a 10 fold increase in concentration of fertilizer composition actually led to a decrease in mycelium diameter. There was not a significant difference in the reduction of diameter in the presence of 0.5% versus 0.75% fertilizer composition. As for *M. bolleyi*, 2.5% fertilizer composition resulted in highly irregular growth of *R. solani* with a ring of darkly pigmented marginal hyphae.

It appears from these results that the chemical constituents in the fertilizer composition may have a slightly stimulatory effect on the growth, while the biological activity works against this to inhibit the growth of the fungus. There are also apparent differences in the mode of action of low versus high dosage amounts of fertilizer composition which could be significant for the antifungal activity in the field.

As the sterilisation of the fertilizer composition was carried out at 121° C., it is possible that some chemical activity could be destroyed at high temperature, and hence the activity of the post-sterilised fertilizer composition could still be caused by chemical and biological activity. This seems unlikely for the following reason. When a tetracycline antibiotic (chloramphenicol) was incorporated into the fertilizer composition, no inhibition was observed when the fertilizer composition was incorporated into the PDA plates. Further work is in progress.

EXAMPLE 13

Effect of Fertilizer Composition on Other Monocrops

The fertilizer composition as described in Example 5 can be applied to sugar cane test plots. The test plots may be pre-soaked, but should be in good condition. Trials are carried out in duplicate. The individual trial plots should have a 50 m$^2$ surface area, and should be in an open location. No fungicidal treatment or fertiliser treatments should be applied during the trial periods. The appearance of the sugar cane should be rated on a scale of 1 to 5, with 1 being poor appearance and 5 being good appearance. After 6 weeks of regular weekly dosing the treatments may be stopped. It should be evident that at the end of this period the sugar cane should have grown better with the fertilizer composition than without.

REFERENCES

Apel, K., Bohlman, H. and Reimann-Philipp, U. (1990). Physiologia Plant: 80, pp. 315-321.

Baker, K. F. and Cook, R. J. (1974). Biological control of plant pathogens. San Francisco: Freeman.

Bryngelsson, T. and Green, B. (1989). Physiol. Molecul. Plant Pathology: 35, pp 45-52.

Cartwright, D., Langcake, P., Pryce, P. J., Leworthy, D. P. and J. P. Ride. (1977). Nature: 267, pp 511-513.

Cook, R. J. (1993). Ann. Rev. Phyto: 31, pp 53-80.

Crockford, C. (1992). The Complete Golf Course: Turf and Design.

Kerby, K. S. and S. Somerville. 1989. Enhancement of specific intercellular peroxidises following inoculation of barley with *Erysiphe graminis*, Physiol. Molecol. Plant Pathology. 35, 323-337

Khal, G. 1978. Biochemistry of wounded plant tissues. Berlin—N.Y., Walter de Gruyter & Co. 41

Kunoh, H., and H. Ishizaki. 1976. Accumulation of chemical elements around the penetration sites of *Erysiphe graminis* hordei on barley leaf epidermis, Physiol. Plant Pathology. 8, 91-96

Magarey, R. C. 1994 in Current trends in Sugarcane Pathology, G. P. Rao, A. G. Gillespie Jr, P. P. Upadhyaya, A. Bergamin, U. P. Agnitiotri, C. T. Chew, (eds). Int. Books and Periodicals, Pitampura, Deli.

Papavizas, G. C. and R. D. Lumsden. 1980. Biological control of soil borne fungal propagules, Annual Review Phytopathology. 18, 389-413

Sch•nbeck, F. and H. W. Dehne. 1986. Use of microbial metabolites including resistance against plant pathogens. In Fokkema, N. J. and J. Van den Heuvel (eds) Microbiology of the phyllosphere. pp 363-375. Cambridge University Press Schisler, D. D. and P. J. Slininger. 1994. Selection and performance of bacterial strains for biologically controlling *Fusarium* dry rot of potatoes incited by *Gibberella* pulicaric, Plant Disease. 78, 251-255

Shiraishi, T., M. Yamaoka, H. Kunoh. 1989. Association between increased phenylalanine ammonia lyase activity and cinnamic acid synthesis and the induction of temporary inaccessibility caused by *Erysiphe graminis* primary germ tube penetration of the barley leaf, Physiol. Molecul. Plant Pathology. 34, 75-83

Shrimp Activa Patent WO97/02356

Spurr, H. W. Jr. And G. R. Knudsen, 1985. Biological control of leaf diseases with bacteria. P.45-62 in C. E. Windels and S. E. Lindow (ed) Biological control on the phylloplane. American Phytopathological Society, St Paul. Minn.

Thordal-Christencen, H. V., Smedegaard-Petessen. 1988. Correlation between induced resistance and host fluorescence in barley inoculated with Erysiphegraminis, J. Phytopathology. 123, 34-46

Weller, D. M. 1988. Biological control of soil borne plant pathogens in the rhizosphere with bacteria. Annual review phytopathology. 26, 379-407

The invention claimed is:

1. A method for producing a fertilizer composition comprising:
   (a) separating spent grain from wort extract;
   (b) separating spent grain liquor from spent grain; and
   (c) recovering said spent grain liquor wherein said spent grain liquor is useful as a fertilizer composition.

2. A fertilizer composition produced by a method according to claim 1.

3. A fertilizer composition according to claim 2, wherein the spent grain liquor comprises cations, free amino nitrogen, glucans, carbohydrates, sugars, amino acid peptides, and polyphenols.

4. A fertilizer composition according to claim 2, wherein the spent grain liquor is a by-product of a brewing process.

5. A fertilizer composition according to claim 2, wherein the spent grain liquor is a by-product of beer brewing.

6. A fertilizer composition according to claim 2, wherein the spent grain liquor comprises both soluble and insoluble material.

7. A fertilizer composition according to claim 6, wherein the soluble material comprises one or more of simple sugars, free amino nitrogen, glucans, vitamins and calcines.

8. A fertilizer composition according to claim 7, wherein the free amino nitrogen is a protein.

9. A fertilizer composition according to claim 6, wherein the insoluble material comprises proteins and/or carbohydrates.

10. A fertilizer composition according to claim 1, wherein the composition is a liquid.

11. A fertilizer composition according to claim 1, wherein the composition is a solid.

12. A fertilizer composition according to claim 1, wherein the solid is a dry powder.

13. A fertilizer composition according to claim 1, wherein said composition further comprises one or more bacterium and/or yeast.

14. A fertilizer composition according to claim 13, wherein said composition comprises a mixture of bacteria selected from the group consisting of *Bacillus* spp, *Pseudomonas* spp, *Azotobacter* spp, *Nitrobacter* spps, *Azospirillium* spp, and *Derxia* spp.

15. A fertilizer composition according to claim 1, wherein said composition further comprises yeast extract and/or a yeast cell wall preparation.

16. A fertilizer composition according to claim 1, further comprising malt extract.

* * * * *